United States Patent
Tang et al.

(10) Patent No.: US 10,391,833 B2
(45) Date of Patent: Aug. 27, 2019

(54) METHOD FOR CONTROLLING DEGREE OF SUPERHEAT OF VEHICLE AIR-CONDITIONING SYSTEM, AND VEHICLE AIR-CONDITIONING SYSTEM

(71) Applicant: Hangzhou Sanhua Research Institute Co., Ltd., Hangzhou, Zhejiang (CN)

(72) Inventors: Li Tang, Zhejiang (CN); Rongrong Zhang, Zhejiang (CN); Edwin J. Stanke, Zhejiang (CN)

(73) Assignee: Hangzhou Sanhua Research Institute Co., Ltd., Hangzhou (CN)

( * ) Notice: Subject to any disclaimer, the term of this patent is extended or adjusted under 35 U.S.C. 154(b) by 515 days.

(21) Appl. No.: 14/905,066

(22) PCT Filed: Jul. 18, 2013

(86) PCT No.: PCT/CN2013/079585
§ 371 (c)(1),
(2) Date: Jan. 14, 2016

(87) PCT Pub. No.: WO2015/006952
PCT Pub. Date: Jan. 22, 2015

(65) Prior Publication Data
US 2016/0159198 A1    Jun. 9, 2016

(51) Int. Cl.
*G05D 23/00* (2006.01)
*B60H 1/00* (2006.01)
(Continued)

(52) U.S. Cl.
CPC ..... *B60H 1/00885* (2013.01); *B60H 1/00978* (2013.01); *B60H 1/3205* (2013.01);
(Continued)

(58) Field of Classification Search
CPC ............ B60H 1/00885; B60H 1/00978; B60H 1/3205
(Continued)

(56) References Cited

U.S. PATENT DOCUMENTS

| | | | |
|---|---|---|---|
| 6,321,549 B1 | 11/2001 | Reason et al. | |
| 6,711,911 B1 * | 3/2004 | Grabon | F25B 41/062 62/175 |

(Continued)

FOREIGN PATENT DOCUMENTS

| | | |
|---|---|---|
| CN | 200510021304 | 1/2007 |
| CN | 102720651 A | 10/2012 |

(Continued)

OTHER PUBLICATIONS

European Search Report for Application No. 13889688.1; dated Mar. 9, 2017.
(Continued)

*Primary Examiner* — Vu A Le
(74) *Attorney, Agent, or Firm* — Boyle Fredrickson S.C.

(57) ABSTRACT

A method for controlling a superheat degree of a vehicle air-conditioning system, and a vehicle air-conditioning system are provided. The method comprises: acquiring an actual superheat degree in real time, a preset superheat degree and a feed-forward information which influences a change of the actual superheat degree; and adjusting an opening degree of an electronic expansion valve in real time according to the actual superheat degree, the preset superheat degree and the feed-forward information that are acquired, so as to control the superheat degree of the vehicle air-conditioning system.

18 Claims, 8 Drawing Sheets

(51) Int. Cl.
*B60H 1/32* (2006.01)
*G05D 23/13* (2006.01)

(52) U.S. Cl.
CPC . *G05D 23/1393* (2013.01); *B60H 2001/3267* (2013.01); *B60H 2001/3272* (2013.01); *B60H 2001/3282* (2013.01); *B60H 2001/3285* (2013.01)

(58) Field of Classification Search
USPC .............. 62/225, 222, 204, 228.5; 700/300
See application file for complete search history.

(56) References Cited

U.S. PATENT DOCUMENTS

| | | | |
|---|---|---|---|
| 6,769,264 B2* | 8/2004 | Moon | F24F 11/83 |
| | | | 62/204 |
| 9,341,398 B2* | 5/2016 | Liu | F25B 41/062 |
| 2007/0028633 A1* | 2/2007 | Suzuki | B60H 1/3211 |
| | | | 62/190 |
| 2009/0151378 A1* | 6/2009 | Kawakatsu | F25B 49/02 |
| | | | 62/225 |
| 2009/0188265 A1* | 7/2009 | Ko | F25B 13/00 |
| | | | 62/222 |
| 2012/0204583 A1* | 8/2012 | Liu | F25B 43/006 |
| | | | 62/129 |
| 2015/0247660 A1* | 9/2015 | Nakajima | F25B 13/00 |
| | | | 62/225 |

FOREIGN PATENT DOCUMENTS

| | | |
|---|---|---|
| CN | 103033004 A | 4/2013 |
| CN | 103033006 A | 4/2013 |
| EP | 0826529 B1 | 2/2003 |
| EP | 2075517 A1 | 7/2009 |
| JP | H0861815 A | 3/1996 |
| JP | H09210518 A | 8/1997 |
| JP | 2004271066 A | 9/2004 |
| KR | 100927072 B1 | 11/2009 |

OTHER PUBLICATIONS

EP Search Report dated Nov. 12, 2018 in EP App. No. 13 889 688.1.

* cited by examiner

METHOD FOR CONTROLLING DEGREE OF SUPERHEAT OF VEHICLE AIR-CONDITIONING SYSTEM, AND VEHICLE AIR-CONDITIONING SYSTEM

TECHNICAL FIELD

This application relates to a method for controlling a superheat degree of a vehicle air-conditioning system and a vehicle air-conditioning system, and particularly to a method for controlling a superheat degree of a vehicle air-conditioning system and a vehicle air-conditioning system in which an opening degree of the electronic expansion valve is controlled through a feed forward information of a compressor and/or an evaporator fan, an actual superheat degree and a preset superheat degree, and this application belongs to the technical field of vehicle air conditioning.

BACKGROUND

A vehicle air-conditioning system mainly includes a compressor, a condenser, a throttling element, and an evaporator. A gaseous refrigerant with high temperature and high pressure discharged from the compressor changes into a liquid refrigerant after being condensed by the condenser. The liquid refrigerant is throttled and depressurized by the throttling element, and then enters into the evaporator to exchange heat, in the evaporator, with air outside the evaporator, and changes into the gaseous refrigerant and then flows back into the compressor, thus accomplishing a refrigeration cycle. The air enters into a vehicle compartment after being cooled by the evaporator, and if the temperature in the vehicle compartment is lower or higher than a preset temperature in the vehicle compartment, a superheat degree is controlled by controlling and regulating an opening degree of the throttling element opening degree.

In a traditional engine automobile, a compressor of an air-conditioning system is directly connected to an engine via a belt, thus a rotational speed of the compressor cannot be controlled. With the gradual popularization of energy-saving and environmental-friendly hybrid automobiles and electric automobiles, more and more automobiles adopt an electric compressor to replace a traditional pulley driven compressor to drive the compressor for providing a motive force for the air-conditioning refrigeration cycle. And the conventional automobile air-conditioning systems mainly employ a thermal expansion valve as a throttling element, and when the thermal expansion valve is used in the electric compressor system, the following problems exist.

An action of a valve needle of the thermal expansion valve is driven by a pressure difference between a saturated pressure corresponding to a bulb in the valve and a pressure in the pipeline, and is completely decided by a mechanical force. Therefore, the thermal expansion valve cannot respond rapidly and correctly to a rapid change of the working condition of the compressor or the evaporator fan. The thermal expansion valve cannot determine the corresponding opening degree according to various parameters of the system, and controlling of the superheat degree is not stable, thus adversely affecting a comfort degree of an air-out temperature. Most of the current new energy automobiles require the air-conditioning system to be not only applied to cool a compartment, but also to cool a battery and a frequency converter, and in the case that the thermal expansion valve is employed in such a double-evaporator type air-conditioning system, the thermal expansion valve cannot be fully shut off during operation of the system, thus fluid still flows in another side of the air-conditioning system when only the evaporator or the heat exchanger works, thereby adversely affecting the efficiency. Also a large amount of liquid is accumulated in low-pressure pipelines at a non-working side, resulting in increasing of a charge amount of the system, thus the system requires to use a relative large liquid accumulator, which increases the cost.

Replacing the thermal expansion valve as a throttling element in the air-conditioning system with the electronic expansion valve has the following advantages.

The electronic expansion valve may be regulated according to various parameters in the air-conditioning system, and the corresponding control strategy may be timely adjusted according to various working conditions, to achieve the objects of improving the efficiency of the cooling system, and saving energy and protecting environment. Controlling the superheat degree by the electronic expansion valve is smoother than controlling the superheat degree by the thermal expansion valve, thus allowing the air-out temperature to be stable, and the comfort degree is improved.

The current household or commercial air conditioners adopt the electronic expansion valve as the throttling element, since the working conditions of the household or commercial air conditioners are stable and the load of a cooling system changes a little, the household or commercial air conditions generally simply employ the superheat degree as a proportion integration differentiation (PID) input parameter to control the opening degree of the electronic expansion valve, to control a refrigerating capacity. However, the automobile air-conditioners are different from the household or commercial air-conditioners, and the working condition of the vehicle air conditioners change rapidly, thus adjusting the electronic expansion valve simply by using the superheat degree may have problems of a slow response speed, and being easily overregulated.

In disclosed patents (such as the patent No. 200510021304.7), a control method for an air-conditioning system of an electric automobile using an electronic expansion valve as the throttling element is put forward, a rotational speed of the compressor and the opening degree of the electronic expansion valve are adjusted by a temperature sensor in the compartment in the control method, however, this control method for the air-conditioning system does not take parameters such as the speed of the evaporator fan and the temperature and pressure of the system into consideration, and in the case that the working condition changes, various issues such as degrading of system efficiency, liquid hammer of the compressor may be caused.

SUMMARY

In order to address issues existing in the above conventional technology, a method for controlling a superheat degree of a vehicle air-conditioning system and a vehicle air-conditioning system are provided according to the present application, in which an electronic expansion valve is adopted as a throttling element, and in addition to adopting an actual superheat degree as an input parameter to adjust the opening degree of the electronic expansion valve, a feed forward information affecting an actual superheat degree is further adopted to control the opening degree of the electronic expansion valve, therefore a response speed is fast and controlling of the superheat degree is smooth.

The technical solution according to the present application is as follows.

A method for controlling a superheat degree of a vehicle air-conditioning system, includes: acquiring, by a control system, an actual superheat degree, a preset superheat degree, and a feed forward information affecting the actual superheat degree in real time; and adjusting a opening degree of an electronic expansion valve in real time according to the actual superheat degree, the preset superheat degree, and the feed forward information acquired, to control the superheat degree of the vehicle air-conditioning system.

The preset superheat degree here does not simply refer to a certain fixed value, and the preset superheat degree may be a corresponding value in a corresponding interval, or a table in which a corresponding value can be looked up according to a corresponding working condition, or a formula which can be obtained based on fitting, etc., and the preset superheat degree for each system is built in the control system according to the result of test, analysis, or fitting. Here, the "real time" in the term "acquiring the actual superheat degree in real time" refers to an acquisition frequency and a control frequency greater than or equal to an inherent sampling frequency of the system, such as 1 HZ, and for the same program, the acquisition frequency and the control frequency should be equal to each other, or the control frequency is an integral multiple of the real-time acquisition frequency. The "real time" in the "adjusting the opening degree of the electronic expansion valve in real time" here refers to that a control signal may be outputted to regulate the opening degree of the electronic expansion valve after an adjustment amount required reaches (namely greater than or equal to) the minimum value set by the program, and the electronic expansion valve does not act in the case that the required adjustment amount is very small, namely, smaller than the minimum value set by the program; and the minimum value set by the program may change with change of an interval of the opening degree in which the electronic expansion valve is located.

A vehicle air-conditioning system is further provided according to the present application, which includes a compressor set, and a throttling element, wherein the compressor set includes a compressor, a condenser, a condenser fan, an evaporator, and an evaporator fan, and the throttling element includes an electronic expansion valve; wherein the vehicle air-conditioning system further includes a second acquisition nodule, a second controller, and an executive control mechanism;

A first acquisition module is configured to acquire an actual superheat degree and feed forward information affecting the change of the actual superheat degree in real time.

A first controller is configured to store a preset superheat degree and receive the actual superheat degree and the feed forward information, and adjust the opening degree of the electronic expansion valve in real time according to the actual superheat degree, the preset superheat degree and the feed forward information.

The advantageous effects of the present application are that: the method for controlling the superheat degree of the vehicle air-conditioning system and the vehicle air-conditioning system according to the present application adopt the electronic expansion valve as the throttling element; and according to the characteristics that the working condition of the vehicle air-condition changes fast, the rotational speed of the compressor and the rotational speed of the evaporator fan are frequently adjusted, in addition to adopting the actual superheat degree as the input parameter to adjust the opening degree of the electronic expansion valve, the method for controlling the superheat degree of the vehicle air-conditioning system and the vehicle air-conditioning system according to the present application also adopt the feed forward information, such as the change of the rotational speed of the compressor, and/or the change of the rotational speed of the evaporator fan, to control the opening degree of the electronic expansion valve, thus having the advantages of a fast response speed, a smooth controlling of the superheat degree, a stable air-out temperature, and an improved comfort degree.

DETAILED DESCRIPTION

Principles and features of the present application are described hereinafter in conjunction with the drawings, and the embodiments listed are only intended to illustrate the present application, and should not be interpreted as a limitation to the scope of the present application.

In the conventional technology, an electronic expansion valve as a throttling element is generally only used in a household or commercial air-conditioning system, and an opening degree of the electronic expansion valve is generally controlled by taking only an actual superheat degree as an input parameter to perform a proportion integration differentiation (PID) control, and sometimes, there are issues such as a slow response speed, being easily overregulated. In a method according to the present application, a feed forward control strategy is adopted to control the opening degree of the electronic expansion valve of a vehicle air-conditioning system, that is, in addition to taking the actual superheat degree as a PID input parameter, the opening degree of the electronic expansion valve is further controlled according to a feed forward information acquired in real time, therefore the response speed thereof is fast, and the superheat degree is smoothly controlled.

Here, firstly, the feed forward is described as follows. The feed forward refers to a control output of the system is not only related to the change of a parameter of an object controlled, and is further related to a disturbance factor affecting the change of the parameter of the object controlled, for example, the control of the opening degree of the electronic expansion valve is not only related to the change of the actual superheat degree, but also related to other parameters in the vehicle air-conditioning system which influence the change of the actual superheat degree and respond more timely than the actual superheat degree does when the working condition changes. Therefore, through the feed forward control strategy, the system can be adjusted when the working condition changes and before the object controlled (actual superheat degree) being affected, to achieve a better control quality. For example, at the same time or slightly later than that the rotational speed or displacement of the compressor and the rotational speed of the evaporator fan change and before the superheat degree changes, the opening degree of the electronic expansion valve is adaptively adjusted in advance.

Figure 1:
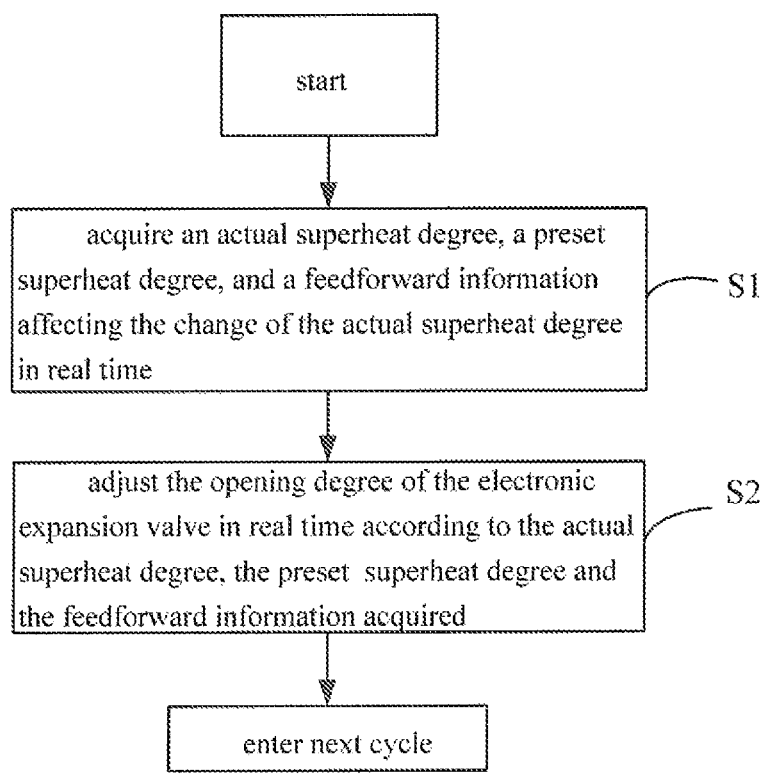
FIG. 1 is a flow block diagram of a method for controlling a superheat degree of a vehicle air-conditioning system according to the present application.

Referring to FIG. 1, the method for controlling a superheat degree of the vehicle air-conditioning system includes the following steps S1 to S2:

In step S1, an actual superheat degree and a preset superheat degree, and a feed forward information affecting change of the actual superheat degree are acquired in real time.

In step S2, the opening degree of the electronic expansion valve is adjusted in real time according to the actual superheat degree, the preset superheat degree and the feed forward information acquired, to control the superheat degree of the vehicle air-conditioning system.

The preset superheat degree here does not only refer to a certain fixed value, and the preset superheat degree may be a corresponding value in a corresponding interval, or a table in which a corresponding value can be looked up according to a corresponding working condition, or a formula which can be obtained by fitting, etc. And various systems have different preset superheat degree, and the preset superheat degree may be built in the control system according to the result of test, analysis, or fitting. For a specific refrigerating system, if a corresponding control strategy for the electronic expansion valve is required to be developed, a lot of performance tests for the system are required to be performed first, to know to what degree should the electronic expansion valve be opened, to achieve an optimal system performance when the system is in a particular situation. After the data are obtained, fitting needs to be performed to acquire a superheat degree corresponding to the optimum coefficient of performance (COP) in various working conditions. Thus the preset superheat degree in related working conditions are obtained and are built in the control system.

In view of the feed forward information affecting the actual superheat degree in the vehicle air-conditioning system, generally, the vehicle air-conditioning system mainly includes a compressor, a condenser, a throttling element, and an evaporator. When the vehicle air-conditioning system is in a stable working condition, the rotational speed and the displacement of the compressor, the rotational speed of the evaporator fan, an ambient temperature outside the vehicle, the temperature in the vehicle, and the opening degree of the electronic expansion valve are all in a relatively stable state. The working condition changes when the environment applies a disturbance to the vehicle air-conditioning system at a certain moment, for example, the vehicle is driven from a shade or a tunnel to a place in the sun, which may result in an abrupt increase of the temperature in the vehicle, a temperature of the evaporator increases, and an evaporating pressure increases. In order to reach a preset air-out temperature, the rotational speed of the compressor is gradually increased, and the rotational speed of the evaporator fan is gradually increased. In such a case, if the opening degree of the electronic expansion valve remains unchanged, such a situation may occur that the evaporating pressure is reduced, while a refrigerating capacity is not much increased, and a phenomenon that the actual superheat degree is too high may occur. Put simply, when the working condition changes, the rotational speed (displacement) of the compressor is increased, and the rotational speed of the evaporator fan is increased, which may cause the actual superheat degree to be increased, and vice versa. However, for allowing the refrigerating system to have a large flow rate, the opening degree of the electronic expansion valve is required to be continuously increased, to allow the actual superheat degree to return to a set value.

As can be known from the above whole process, after the working condition changes, and after the rotational speed of the evaporator fan, and the rotational speed and/or displacement of the compressor have been increased for a certain time (generally, 5 to 10 seconds, which is determined according to sensitivities of a pressure sensor and a temperature sensor configured to acquire the actual superheat degree), the pressure sensor and the temperature sensor can then learn an actual change of the working condition, and further start to adjust the opening degree of the electronic expansion valve.

Therefore, the feed forward information according to the present application is preferably as follows: for a variable displacement compressor, the feed forward information includes a rotational speed and displacement of the compressor, and for a fixed displacement compressor, the feed forward information includes the rotational speed of the compressor, and/or change information of the rotational speed of the evaporator fan. Of course, as can be seen from the above whole process, and in conjunction with an operating principle of the air-conditioning system, the feed forward information may further include a rotational speed of a condenser fan, etc.

Figure 2:
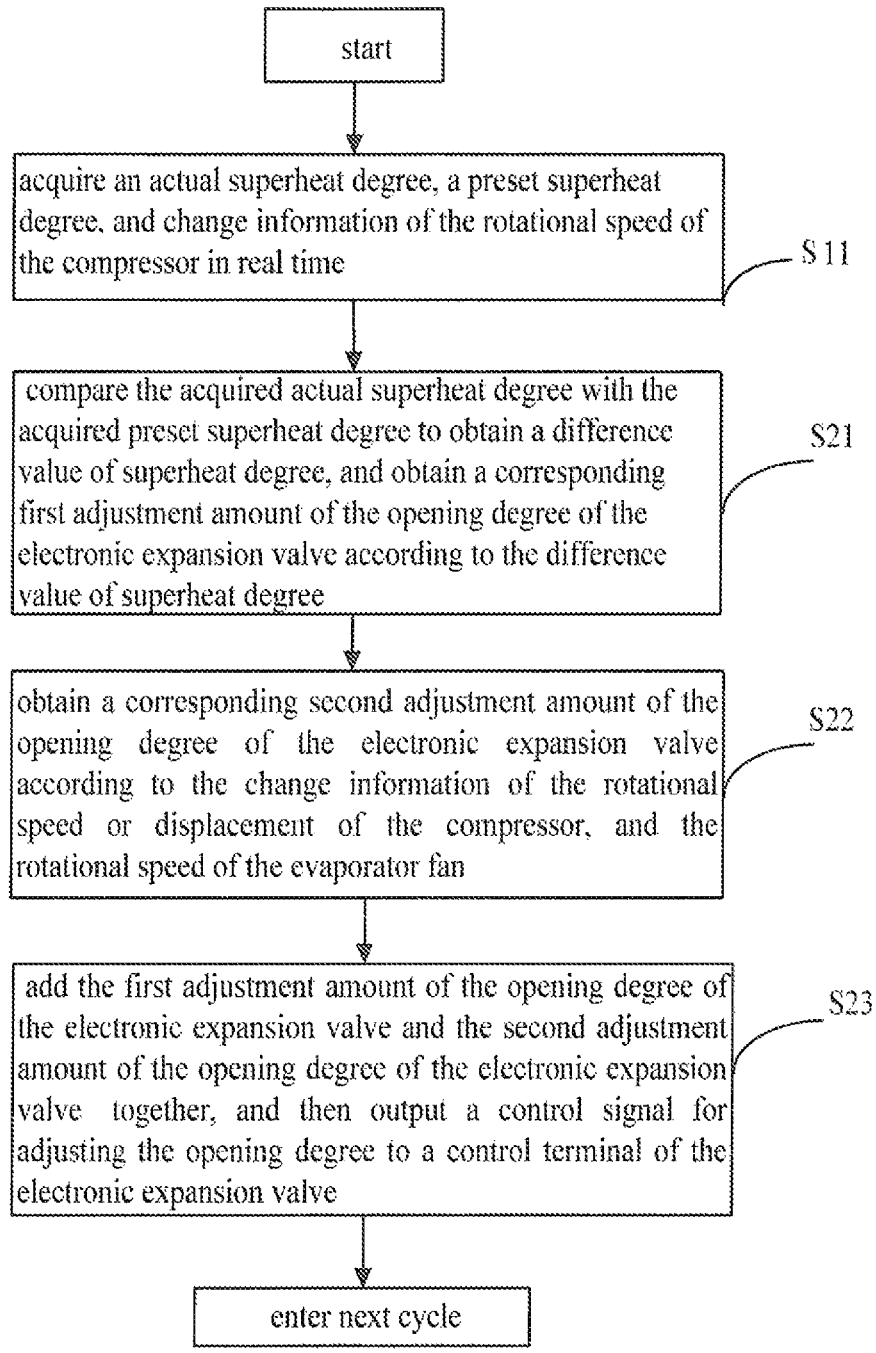
FIG. 2 is a flow block diagram showing an embodiment of the method for controlling the superheat degree of the vehicle air-conditioning system according to the present application.

Reference is made to FIG. 2, which is a flow chart showing three embodiments of the method for controlling according to the present application.

As shown in FIG. 2, in the case that the feed forward information is the change of the rotational speed of the compressor, the method for controlling the superheat degree of the vehicle air-conditioning system specifically includes the following steps S11 to S23.

In step S11, an actual superheat degree, a preset superheat degree, and a change information of the rotational speed of the compressor are acquired in real time.

In step S21, the actual superheat degree, and the preset superheat degree acquired are compared to obtain a difference value of superheat degree, and a corresponding first adjustment amount $V_{out}1$ of the opening degree of the electronic expansion valve is obtained according to the difference value of superheat degree, the first adjustment amount $V_{out}1$ of the opening degree of the electronic expansion valve may be obtained by calculating the formula:

$$V_{out}1 = K_p \times e + K_d \times \frac{de}{dt} + K_i \times \int_n^t e\,dt + C,$$

in the formula, e is a difference value of superheat degree between the actual superheat degree and the preset superheat degree, $K_p$ is a proportionality coefficient, $K_d$ is a differential coefficient, $K_i$ is an integral coefficient, and C is a correction coefficient; where, the proportionality coefficient $K_p$, the differential coefficient $K_d$, the correction coefficient C and the integral coefficient $K_i$ may be obtained according to experience or an experimental calibration or fitting.

In step S22, a corresponding second adjustment amount $V_{out}2$ of the opening degree of the electronic expansion valve is acquired according to the change information of the rotational speed of the compressor acquired. Specifically, in the case that the opening degree of the electronic expansion valve is adjusted according to the change information of the rotational speed of the compressor, a control principle thereof is similar to a differentiation element, and the changing of the rotational speed of the compressor with the time changing has a corresponding function of CS(t), and a differential value at a certain time t0 is $$\left. \frac{dCS}{dt} \right|_{t=t0},$$

thus a second adjustment amount $V_{out}2$ of the opening degree of the electronic expansion valve may be obtained according to the following calculation:

$$V_{out}2 = K_{CS} \times \frac{dCS}{dt},$$

in the formula, $K_{CS}$ is a feedback coefficient of the compressor, and CS is a rotational speed of the compressor; where, the feedback coefficient $K_{CS}$ of the compressor is a coefficient obtained according to experience or experimental calibration.

In step S23, the control system adds the first adjustment amount $V_{out}1$ of the opening degree of the electronic expansion valve and the second adjustment amount $V_{out}2$ of the opening degree of the electronic expansion valve together to output a control signal for adjusting the opening degree to a control terminal of the electronic expansion valve, to control the opening degree of the electronic expansion valve, that is, an adjustment amount $V_{out}$ of the opening degree of the electronic expansion valve may be obtained by calculating the formula:

$$V_{out} = K_p \times e + K_d \times \frac{de}{dt} + K_i \times \int_n^t e\, dt + C + K_{CS} \times \frac{dCS}{dt},$$

in the formula, e is a difference value of superheat degree between the actual superheat degree and the preset superheat degree, $K_p$ is a proportionality coefficient, $K_d$ is a differential coefficient, $K_i$ is an integral coefficient, $K_{CS}$ is a feedback coefficient of the compressor, CS is a rotational speed of the compressor, and C is a correction coefficient.

It should be noted that, if the compressor is a variable displacement compressor, accordingly the change of the rotational speed of the compressor in the above control method is the change of the rotational speed and the change of the displacement of the compressor.

A second embodiment of the present application is described hereinafter, unlike the first embodiment, the feed forward information in this embodiment is the change information of the rotational speed of the evaporator fan, the specific steps S11' to S22' are as follows.

In step S1', an actual superheat degree, a preset superheat degree, and a change information of the rotational speed of the evaporator fan are acquired in real time.

In step S21', the actual superheat degree and the preset superheat degree acquired are compared to obtain a difference value of superheat degree, and a corresponding first adjustment amount $V_{out}1$ of the electronic expansion valve is obtained according to the difference value of superheat degree; specifically, the first adjustment amount $V_{out}1$ of the opening degree of the electronic expansion valve may be obtained by calculating the formula:

$$V_{out}1 = K_p \times e + K_d \times \frac{de}{dt} + K_i \times \int_n^t e\, dt + C,$$

in the formula, e is a difference value of superheat degree between the actual superheat degree and the preset superheat degree, $K_p$ is a proportionality coefficient, $K_d$ is a differential coefficient, $K_i$ is an integral coefficient, and C is a correction coefficient; where, the proportionality coefficient $K_p$, the differential coefficient $K_d$, and the integral coefficient $K_i$ are obtained according to experience or the experimental calibration or fitting.

In step S22', a corresponding second adjustment amount $V_{out}2$ of the opening degree of the electronic expansion valve is acquired according to the change information of the rotational speed of the evaporator fan acquired; specifically, a second adjustment amount $V_{out}2$ of the opening degree of the electronic expansion valve may be obtained by calculating the formula:

$$V_{out}2 = K_{BS} \times \frac{dBS}{dt},$$

in the formula, BS is a rotational speed of the evaporator fan, and $K_{BS}$ is a feedback coefficient of evaporator fan; where the feedback coefficient $K_{BS}$ of the evaporator fan is a coefficient obtained according to experience or the experimental calibration or fitting.

In step S23', the first adjustment amount $V_{out}1$ of the opening degree of the electronic expansion valve, and a second adjustment amount $V_{out}2$ of the opening degree of the electronic expansion valve are added together, and a control signal for adjusting the opening degree is outputted to a control terminal of the electronic expansion valve, to control the opening degree of the electronic expansion valve, that is, the adjustment amount $V_{out}$ of the opening degree of the electronic expansion valve may be obtained by calculating the formula:

$$V_{out} = K_p \times e + K_d \times \frac{de}{dt} + C + K_i \times \int_n^t e\, dt + K_{BS} \times \frac{dBS}{dt}.$$

In the above step, the proportionality coefficient $K_p$, the differential coefficient $K_d$, and the integral coefficients $K_i$ and $K_{BS}$ may be obtained by experience or methods of experimental calibration or simulation and fitting.

Furthermore, a method for obtaining the feedback coefficient $K_{BS}$ of the evaporator fan according to experimental regulation in the above step S22' is specifically described as follows.

A third embodiment of the present application is provided hereinafter, unlike the first embodiment and the second embodiment, the feed forward information in this embodiment includes the change information of the rotational speed of the evaporator fan, and the change information of the rotational speed of the compressor, and the control steps S11" to S23" are specifically as follows.

In step S11", an actual superheat degree, a preset superheat degree, a change information of the rotational speed of the evaporator fan, and a change information of the rotational speed of the compressor are acquired in real time.

In step S21", the actual superheat degree and the preset superheat degree acquired are compared to obtain a difference value of superheat degree, and a corresponding first adjustment amount $V_{out}1$ of the opening degree of the electronic expansion valve is obtained according to the difference value of superheat degree.

Specifically, the first adjustment amount $V_{out}1$ of the opening degree of the electronic expansion valve may be obtained by calculating the formula:

$$V_{out}1 = K_p \times e + K_d \times \frac{de}{dt} + K_i \times \int_n^t e \, dt + C,$$

in the formula, e is a difference value of superheat degree between the actual superheat degree and the preset superheat degree, $K_p$ is a proportionality coefficient, $K_d$ is a differential coefficient, $K_i$ is an integral coefficient, and C is a correction coefficient; where, the proportionality coefficient $K_p$, the differential coefficient $K_d$, the integral coefficient $K_i$, and the correction coefficient C are coefficients obtained according to experience or methods of experimental calibration or simulation and fitting.

In step S22", a corresponding second adjustment amount $V_{out}2$ of the opening degree of the electronic expansion valve is obtained according to the change information of the rotational speed of the compressor and the change information of the rotational speed of the evaporator fan.

Specifically, the second adjustment amount $V_{out}2$ of the opening degree of the electronic expansion valve may be obtained by calculating the formula:

$$V_{out}2 = K_{CS} \times \frac{dCS}{dt} + K_{BS} \times \frac{dBS}{dt},$$

in the formula, $K_{CS}$ is a feedback coefficient of the compressor, and CS is a rotational speed of the compressor, where, BS is a rotational speed of the evaporator fan, $K_{BS}$ is the feedback coefficient of the evaporator fan; the feedback coefficient $K_{CS}$ of the compressor, and the feedback coefficient $K_{BS}$ of the evaporator fan are obtained according to experience, an experimental calibration or fitting.

In step S23", the control system add the first adjustment amount $V_{out}1$ of the opening degree of the electronic expansion valve and the second adjustment amount $V_{out}2$ of the opening degree of the electronic expansion valve together, to output a control signal for adjusting the opening degree to a control terminal of the electronic expansion valve, to control the opening degree of the electronic expansion valve, that is, the adjustment amount $V_{out}$ of the opening degree of the electronic expansion valve may be obtained by calculating the formula:

$$V_{out} = K_p \times e + K_d \times \frac{de}{dt} + K_i \times \int_n^t e \, dt + C + K_{CS} \times \frac{dCS}{dt} + K_{BS} \times \frac{dBS}{dt}.$$

In the above step, the proportionality coefficient $K_p$, the differential coefficient $K_d$, the integral coefficient $K_i$, as well as the feedback coefficient $K_{CS}$ of the compressor and the feedback coefficient $K_{BS}$ of the evaporator fan may also be obtained by methods of experience, experimental calibration or simulation and fitting. In addition, the feed forward information may also include the change information of the rotational speed of the evaporator fan, and the change information of the rotational speed and the displacement of a compressor fan of the compressor. Moreover, the feed forward information may further include a change information of a condenser fan. Which kind of information is used as the feed forward information may be obtained by methods of experiment, etc. according to a specific system.

A specific example is described hereinafter to illustrate an operating process of the control method according to the present application.

When the vehicle is driven from a tunnel to a place exposed in the sun during the advancing process, the temperature in the vehicle may be abruptly increased, and further a temperature in the evaporator is increased and an evaporating pressure is increased. According to a set air-out temperature, the rotational speed of the compressor is increased, and the controller immediately acquires the change information of the rotational speed of the compressor, and performs a pre-adjustment to the opening degree of the electronic expansion valve immediately. Increasing of the rotational speed of the compressor may cause the actual superheat degree to be increased, and the controller acquires the actual superheat degree, the difference value e of the superheat degree may change, thus the opening degree of the electronic expansion valve may be adjusted. Thus, the opening degree of the electronic expansion valve increases, and a large refrigerant flow quantity is brought to the system, and a refrigerating capacity is gradually increased, then the temperature in the vehicle compartment is gradually decreased, and returns approximately to the preset superheat degree. The disturbance is thus eliminated, the rotational speed of the compressor does not increase anymore, and tends to a certain rotational speed, and the opening degree of the electronic expansion valve does not increase anymore, and gradually tends to a certain opening degree.

That is, the system controls adjusting the opening degree of the electronic expansion valve immediately after the rotational speed or the displacement of the compressor changes, thus has a much faster response speed and a smaller system fluctuation compared with a system in which the opening degree of the electronic expansion valve is adjusted after the signal of the actual superheat degree being obtained.

Similarly, when the rotational speed of the evaporator fan increases, the efficiency of heat exchange of the evaporator is increased and the temperature of the refrigerant is increased, and also the actual superheat degree is increased accordingly. Adjusting the opening degree of the electronic expansion valve immediately after the rotational speed of the evaporator fan changes may have a much faster response speed and a smaller system fluctuation compared with adjusting the opening degree of the electronic expansion valve after the pressure sensor and the temperature sensor acquire a signal of the actual superheat degree.

Figure 3:
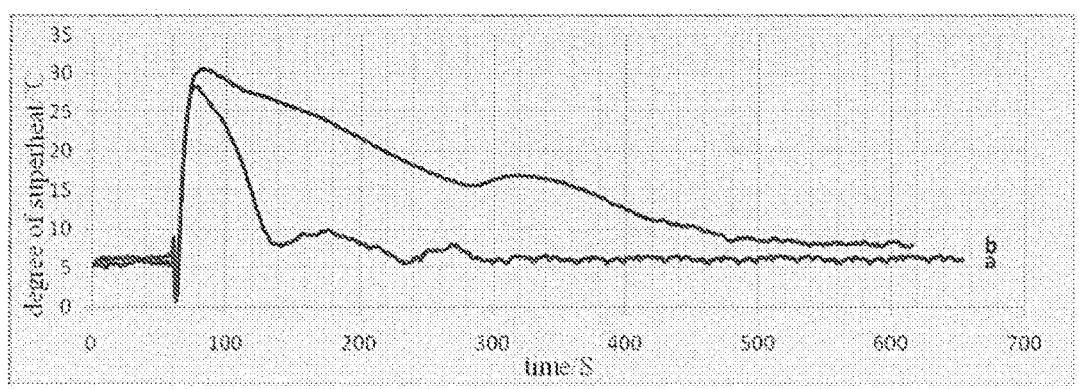
FIG. 3 is a view showing the relationship between the superheat degree and a control time obtained by comparing the method for controlling the superheat degree of the vehicle air-conditioning system according to the present application with the conventional technology.

FIG. 3 is a view showing the relationship between a superheat degree and a control time of the system, in which a method for controlling the superheat degree only employing the actual superheat degree to control the opening degree of the electronic expansion valve is taken as a contrast method and is compared with the method according to the present application. In the figure, curve a is a relationship curve between the superheat degree and the control time of the method according to the present application; and curve b is a relationship curve between the superheat degree and the control time of the contrast method.

As can be known from the curves a and b in FIG. 3, if the superheat degree is controlled through the method according to the present application, a fluctuation range of the actual superheat degree is small and the control time thereof is short, however, if the superheat degree is controlled through the contrast method, a fluctuation range of actual superheat degree is large and the control time is long. That is to say, since the feed forward strategy is adopted to control the superheat degree in the method according to the present application, a disturbance magnitude and a change direction may be immediately obtained after the rotational speed of the compressor or the fan of the system changes, thus the change of the superheat degree may be estimated in advance, and compared with the conventional control method in which corresponding control is performed only after the actual superheat degree of the system changes, the system has a smaller fluctuation, and the time required by the actual superheat degree to return to the preset superheat degree is shorter.

Besides, it is to be noted that, a valve needle of the electronic expansion valve moves in a manner different from that of a thermal expansion valve. A stepper motor is adopted to drive the valve needle of the electronic expansion valve to rotate along screw threads, and each round of the stepper motor allows the valve needle to be lifted or lowered by one thread pitch, to realize the object of moving the valve needle to control the opening degree of the electronic expansion valve. A rotational speed of the stepper motor is restricted by a coil, and the performance of a controller, thus generally cannot reach a moving speed of the thermal expansion valve. Assuming that the rotational speed of the stepper motor is 80 pulses per second (pps), and an entire travel of the coil of the valve is 480 steps, then it takes 6 seconds for the electronic expansion valve to switch from a fully closed state to a fully open state. Therefore, for optimizing the controlling of the superheat degree of the system, change rates of the rotational speeds of the compressor and the evaporator fan cannot be too large, thus preventing causing a change rate of the opening degree of the electronic expansion valve to be unable to keep up, and the superheat degree of the vehicle air-conditioning system to be maladjusted. Thus, the adjustment amount of the opening degree of the electronic expansion valve should not exceed a maximum change rate of the opening degree of the electronic expansion valve, that is to say, when the rotational speed of the compressor or the rotational speed of the evaporator fan changes, a feedback value corresponding to a change rate thereof does not exceed the action speed of the electronic expansion valve.

In addition, a plurality of intervals are arranged according to the opening degree of the electronic expansion valve in a full opening degree of the electronic expansion valve, and each interval has corresponding minimum action steps. The minimum action steps corresponding to each interval may be different, and when the action steps of the electronic expansion valve required by a current calculation result are less than the minimum action steps corresponding to the interval where the electronic expansion valve is located, the electronic expansion valve keeps still, until a value of action steps required is greater than the that of the minimum action steps. Generally, the smaller the opening degree of the electronic expansion valve is, the less the minimum action steps the corresponding interval has, thus the disturbance to the system can be reduced.

Furthermore, it is to be noted that, in the method according to the present application, a pressure sensor may be adopted to acquire the rotational speed of the compressor or the rotational speed of the evaporator fan. After the vehicle air-conditioning system stopping operating for a long time, the system has not yet been operated in a stable working condition at the beginning of start for the first time, and since a response speed of the pressure sensor is larger than that of the temperature sensor, a pressure decreases more fast than a temperature does, a superheat degree displayed may drastically increase at the beginning of the operation, and an opening degree of the electronic expansion valve obtained by calculation may be greater than the opening degree actually required, causing the flow rate of the refrigerant in the system to be too large and a current of the compressor to be too large to cause overload. Therefore, in the case that the vehicle air-conditioning system is just started, or in the case that the compressor has stopped operating over a certain time, such as 5 minutes, a restart speed is configured to be not greater than a fixed ratio such as 50% of the maximum rotational speed, and the restart speed maintains for a certain period of time, for example 15 seconds, and then a normal control is restored. That is, the control method according to the present application is generally adapted to the control of the vehicle air-conditioning system in normal operating conditions, which may be specifically set by a control program. The limitation to the change rates of the rotational speeds of the compressor and the evaporator fan, and the limitation to the compressor when the system starts may better protect the vehicle air-conditioning system, and improve a control accuracy of the superheat degree.

Figure 4:
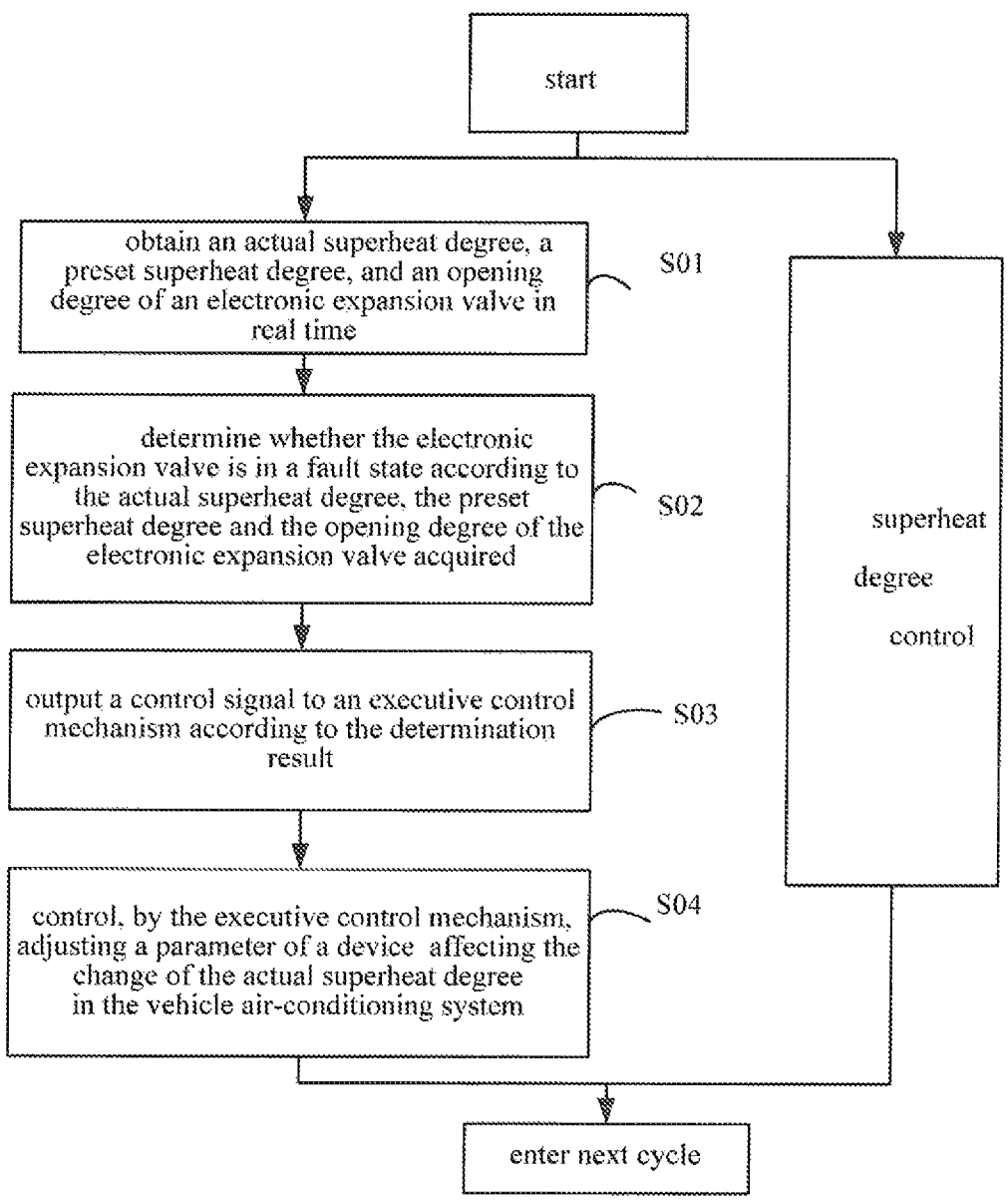
FIG. 4 is a flow block diagram showing a fourth embodiment of the method for controlling the superheat degree of the vehicle air-conditioning system according to the present application.

In addition, in the conventional technology, when the electronic expansion valve has a stalling fault, and is locked somewhere thus failing to operate, or when a fault occurs to the electronic expansion valve or to the communication with the electronic expansion valve thus the electronic expansion valve cannot be opened to a certain interval, the current vehicle air-conditioning system cannot take corresponding countermeasures against the fault, which may damage the air-conditioning system. In view of the above deficiencies, the method for controlling the superheat degree of the vehicle air-conditioning system according to the present application is further optimized based on several embodiments described above. Referring to FIG. 4, the control method of the present application in this embodiment, while controlling the superheat degree by the feed forward control strategy, further performs a fault diagnosis processing of the electronic expansion valve, and the fault diagnosis processing of the electronic expansion valve specifically includes the following steps S01 to S04.

In step S01, an opening degree of an electronic expansion valve, an actual superheat degree and a preset superheat degree are acquired in real time.

In step S02, whether the electronic expansion valve is in a fault state is determined according to the actual superheat degree, the preset superheat degree and the opening degree of the electronic expansion valve, and a fault diagnosis is effectively performed in real time to the electronic expansion valve and communication with the electronic expansion valve during controlling of the superheat degree.

In step S03, a control signal is outputted to an executive control mechanism when the determination result is that the electronic expansion valve and the communication with the electronic expansion valve is in the fault state.

In step S04, the executive control mechanism controls adjusting a parameter of a device affecting change of the actual superheat degree in the vehicle air-conditioning system to adjust the superheat degree of the vehicle air-conditioning system.

The opening degree of the electronic expansion valve acquired here generally refers to a theoretical opening degree. For example, in the case that a software part in a control system is in a vehicle-mounted controller, and there is communication means, such as a controller area network or vehicle local interconnect network (CAN/LIN), through which communication with the electronic expansion valve can be performed, and the electronic expansion valve can feedback the location information, the opening degree of the electronic expansion valve refers to the opening degree fed back by the electronic expansion valve, in such a case, a scope of fault diagnosis only covers the electronic expansion valve. In the case that the electronic expansion valve cannot feedback information, the opening degree of the electronic expansion valve refers to an opening degree to which the electronic expansion valve is required by an instruction outputted by of a software program in the control system to operate, in such a case, the scope of fault diagnosis covers the electronic expansion valve and a communication program. In the case that the software part in the control system is located in the electronic expansion valve and directly controls the action of the electronic expansion valve, the opening degree of the electronic expansion valve refers to a location of the instruction outputted by the program, in such a case, the scope of fault diagnosis only covers the electronic expansion valve. In addition, the above diagnosis and processing procedures may be simultaneously performed with controlling of the superheat degree, and may also be a part provided in control procedures of the superheat degree.

The parameter of the device affecting the change of the actual superheat degree in the vehicle air-conditioning system includes the rotational speed or the displacement $C_1$ of the compressor, and/or the rotational speed $C_2$ of the evaporator fan.

Figure 5:
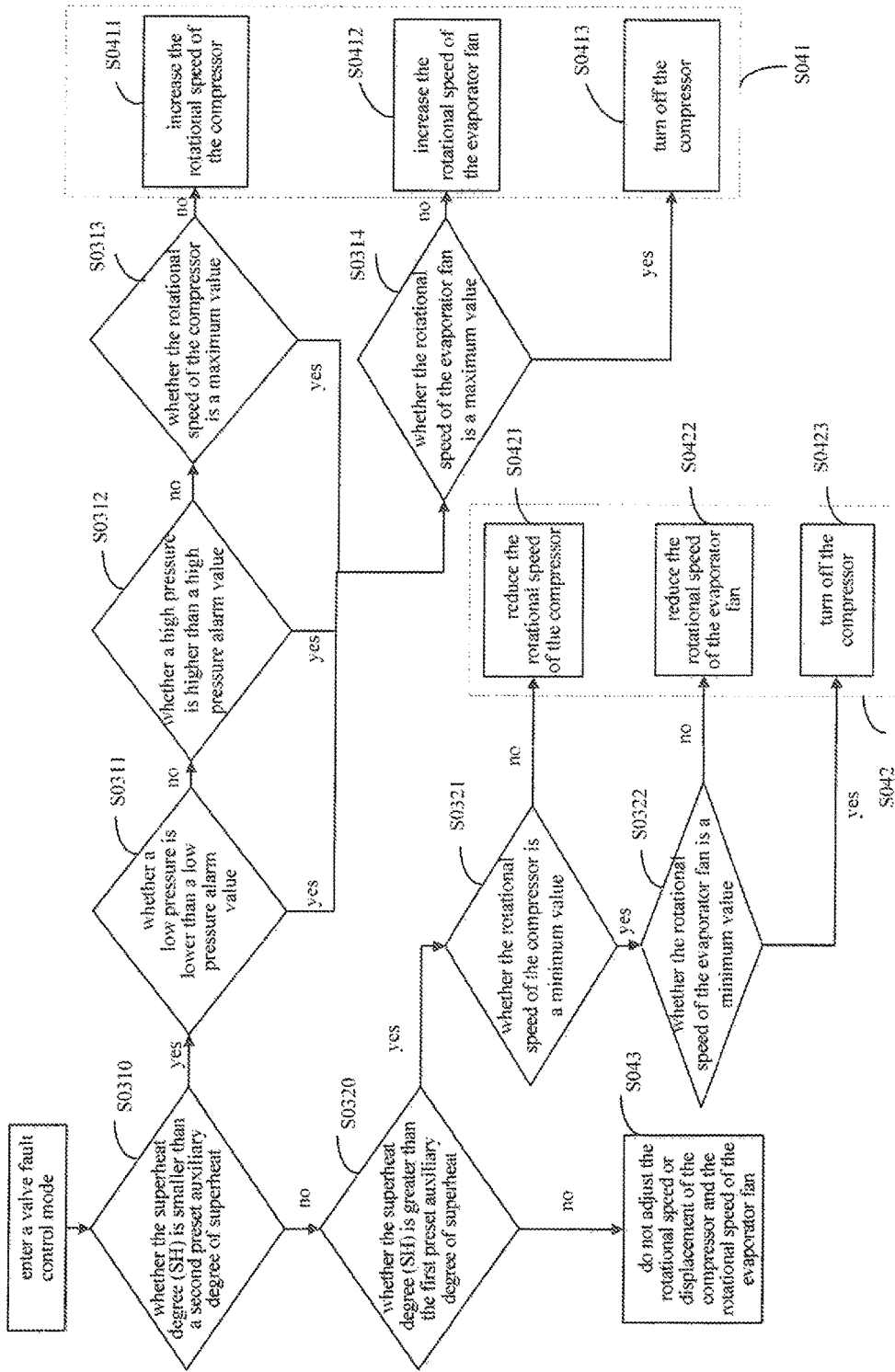
FIG. 5 is a flow block diagram showing a fault diagnose process in the fourth embodiment of the method for controlling the superheat degree of the vehicle air-conditioning system according to the present application.

In this embodiment, as shown in FIG. 5, step S02 is a process of fault diagnose performed according to the relationship between the actual superheat degree and the preset superheat degree, and the opening degree of the electronic expansion valve. The process of determining and processing a fault state includes the following steps S01 to S05.

In step S01, an opening degree of an electronic expansion valve, an actual superheat degree, and a preset superheat degree are acquired.

In step S021, whether the preset superheat degree minus the actual superheat degree is greater than a first fixed value w1 is determined, and step S022 is performed if the preset superheat degree minus the actual superheat degree is greater than the first fixed value w1, and step S025 is performed if the preset superheat degree minus the actual superheat degree is not greater than the first fixed value w1.

In step S022, it is determined whether the opening degree of the electronic expansion valve reaches a minimum value; and step S023 is performed if the electronic expansion valve reaches the minimum value, and step S025 is performed if the electronic expansion valve does not reach the minimum value.

In step S023, a number of error times n of the valve is added by 1.

In step S024, it is determined whether the accumulated number of error times n in a first time span t1 is greater than or equal to a preset number of error times N; and if the accumulated number of error times n is greater than or equal to the preset number of error times N, it is determined that the electronic expansion valve or the communication with the electronic expansion valve is currently in the fault state and step S03 is performed, and step S05 is simultaneously performed, and the accumulated number of error times n of the valve is reset; in addition, the accumulated number of error times n here may also not be reset till a normal state is determined.

In Step S03, a control signal is outputted to a control executive mechanism according to the determination result.

Specifically, in step S024, if the accumulated number of error times n of the electronic expansion valve taking the first time span t1 as a cycle is smaller than the preset number of error times N, no operation is performed, entering a next fault diagnosis cycle.

That is to say, in the case that the preset superheat degree is greater than the actual superheat degree, the valve performs an action of reducing the opening degree to increase the actual superheat degree to reach the preset superheat degree. Apparently, in the above steps S021 and S022, it is determined that an error occurs to the controlling of the superheat degree and the valve enters a fault control mode in the case that the preset superheat degree is greater than the actual superheat degree by the first fixed value w1 and the opening degree of the electronic expansion valve reaches the minimum value at this moment, and such case continuously maintains for N times.

On the contrary, in the case that the actual superheat degree is greater than the preset superheat degree, the valve performs an action of increasing the opening degree to reduce the actual superheat degree to reach the preset superheat degree. Similarly, in the case that the preset superheat degree is greater than the actual superheat degree by a second fixed value w2, and the opening degree of the electronic expansion valve reaches the maximum value at this moment, and such case continuously maintains for N times, it is determined that an error occurs to the controlling of the superheat degree and the valve enters a fault control mode. The process is specifically performed according to the following steps S025 to S026.

In step S025, it is determined whether the actual superheat degree minus the preset superheat degree is greater than the second fixed value w2, and step S026 is performed if the actual superheat degree minus the preset superheat degree is greater than the second fixed value w2, and step S05 is performed if the actual superheat degree minus the preset superheat degree is not greater than the second fixed value w2, namely, the corresponding error report is caused by an influence or interference of an external factor, the accumulated number of error times n of the parameters in the process is reset, entering a next fault diagnosis cycle.

In step S026, if the opening degree of the electronic expansion valve reaches the maximum value, it is determined whether the opening degree of the electronic expansion valve reaches the maximum value, step S023 is performed and the number of error times n of the valve is added by 1; and if the accumulated numbers of two error times n in the first time span t1 are greater than or equal to the preset number of error times N, step S03 is performed, a control signal is outputted to the executive mechanism according to the determination result and step S05 is simultaneously performed, and the accumulated number of error times n is reset. If the opening degree of the electronic expansion valve does not reach the maximum value, step S05 is performed, that is, the corresponding error report is caused by the influence or interference of an external factor, the accumulated number of error times n is reset, entering a next fault diagnosis cycle.

In addition, a vehicle is required to work within a limiting working condition range designed by a refrigerating system, for example, the vehicle works in a special working condition such as a condition in which a temperature outside a vehicle compartment exceeds a limiting temperature designed by the refrigerating system of the vehicle. Influenced by the above special working condition, an operating parameter of the refrigerating system may usually generate the above error report phenomenon. Apparently, the interference of various external factors which are beyond the limiting working condition range may directly affect an accuracy of the fault diagnosis in the control method according to this solution. For addressing this issue, step S0 of determining whether the vehicle air-conditioning system is within the limiting working condition range may be added before step S01, as shown in FIG. 5 specifically.

In step S0, it is determined whether the electronic expansion valve is within a limiting working condition range. If the electronic expansion valve is not within the limiting working condition range, step S01 is performed to carry out the fault diagnosis; and if the air-conditioning system is within the limiting working condition range, entering a next fault diagnosis cycle, that is, stopping performing the subsequent fault diagnosis steps, to avoid the problem of error report in abnormal conditions.

Figure 6:
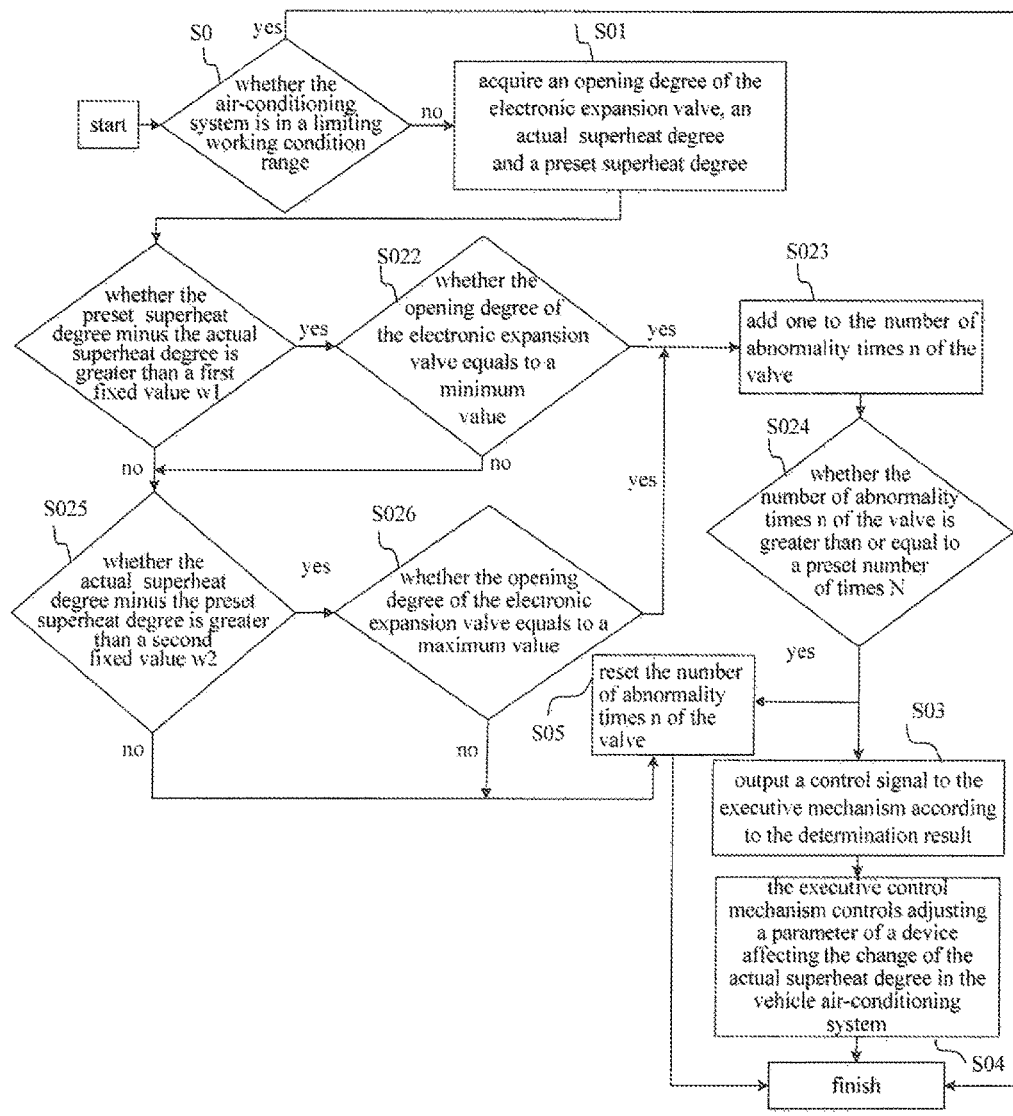
FIG. 6 is a flow block diagram showing the fourth embodiment of the method for controlling the superheat degree of the vehicle air-conditioning system according to the present application in a fault control mode.

In steps S03 and S04 in the fourth embodiment, when the determination result is that the electronic expansion valve and the communication with the electronic expansion valve are in the fault state, as shown in FIG. 6, the specific control steps S031 to S043 are as follows.

In step S031, it is determined whether the actual superheat degree is smaller than a second preset auxiliary superheat degree; step S041 is performed if the actual superheat degree is smaller than the second preset auxiliary superheat degree, and step S032 is performed if the actual superheat degree is not smaller than the second preset auxiliary superheat degree.

In step S032, it is determined whether the actual superheat degree is greater than a first preset auxiliary superheat degree; step S042 is performed if the actual superheat degree is greater than the first preset auxiliary superheat degree, and step S043 is performed if the actual superheat degree is not greater than the first preset auxiliary superheat degree.

In step S041, the rotational speed or the displacement $C_1$ of the compressor is increased, or the rotational speed $C_2$ of the evaporator fan is increased, or the compressor is turned off.

In step S042, the rotational speed or the displacement $C_1$ of the compressor is reduced, or the rotational speed $C_2$ of the evaporator fan is reduced, or the compressor is turned off.

In step S043, the rotational speed or the displacement $C_1$ of the compressor and the rotational speed $C_2$ of the evaporator fan are not adjusted.

In the above steps, the first preset auxiliary superheat degree and the second preset auxiliary superheat degree may be set according to an actual situation. As shown in FIG. 6, in the above step S031, in the case that the actual superheat degree is smaller than the second preset auxiliary superheat degree, the specific control steps S0310 to S0413 are as follows.

In step S0310, it is determined whether the actual superheat degree is smaller than the second preset auxiliary superheat degree: step S0311 is performed if the actual superheat degree is smaller than the second preset auxiliary superheat degree, and step S0320 is performed if the actual superheat degree is not smaller than the second preset auxiliary superheat degree.

In step S0311, it is determined whether a low pressure is lower than a low pressure alarm value; step S0314 is performed if the low pressure is lower than the low pressure alarm value, and step S0312 is performed if the low pressure is not lower than the low pressure alarm value.

In step S0312, it is determined whether a high pressure is higher than a high pressure alarm value; step S0314 is performed if the high pressure is higher than the high pressure alarm value, and step S0313 is performed if the high pressure is not higher than the high pressure alarm value.

In step S0313, it is determined whether the rotational speed or the displacement $C_1$ of the compressor is a maximum value $C_{1max}-\Delta_3$; step S0314 is performed if the rotational speed or displacement $C_1$ of the compressor is the maximum value $C_{1max}-\Delta_3$, and step S0411 is performed if the rotational speed or the displacement $C_1$ of the compressor is not the maximum value $C_{1max}-\Delta_3$.

In step S0314, it is determined whether the rotational speed $C_2$ of the evaporator fan is a maximum value $C_{1max}-\Delta_4$; step S0413 is performed if the rotational speed $C_2$ of the evaporator fan is the maximum value $C_{2max}-\Delta_4$, and step S0412 is performed if the rotational speed $C_2$ of the evaporator fan is not the maximum value $C_{2max}-\Delta_4$.

In step S0411, the rotational speed or the displacement $C_1$ of the compressor is increased.

In step S0412, the rotational speed $C_2$ of the evaporator fan is increased.

In step S0413, the compressor is turned off.

In the above steps. $\Delta_3 \geq 0$ and $\Delta_4 \geq 0$, and values of $\Delta_3$ and $\Delta_4$ can be set according to the actual situation, to ensure safe operations of the compressor and the evaporator fan.

As shown in FIG. 6, in the above step S032, in the case that the actual superheat degree is greater than the first preset auxiliary superheat degree, the specific control steps S0320 to S0423 are as follows.

In step S0320, it is determined whether the actual superheat degree is greater than the first preset auxiliary superheat degree; step S0321 is performed if the actual superheat degree is greater than the first preset auxiliary superheat degree, and step S043 is performed if the actual superheat degree is not greater than the first preset auxiliary superheat degree.

In step S0321, it is determined whether the rotational speed or the displacement $C_1$ of the compressor is a minimum value $C_{1min}+\Delta_1$; step S0322 is performed if the rotational speed or displacement $C_1$ of the compressor is the minimum value $C_{1min}+\Delta_1$, and step S0421 is performed if the rotational speed or displacement $C_1$ of the compressor is not the minimum value $C_{1min}+\Delta_1$.

In step S0322, it is determined whether the rotational speed $C_2$ of the evaporator fan is a minimum value $C_{2min}+\Delta_2$; step S0423 is performed if the rotational speed $C_2$ of the evaporator fan is at the minimum value $C_{2min}+\Delta_2$, and step S0422 is performed if the rotational speed of the evaporator fan $C_2$ is not the minimum value $C_{2min}+\Delta_2$.

In step S0421, the rotational speed or the displacement $C_1$ of the compressor is reduced.

In step S0422, the rotational speed of the evaporator fan $C_2$ is reduced.

In step S0423, the compressor is turned off.

In the above steps, $\Delta_1 \geq 0$ and $\Delta_2 \geq 0$, and the values of $\Delta_1$ and $\Delta_2$ can be set according to the actual situation, to ensure safe operations of the compressor and the evaporator fan.

The above control process is described hereinafter through an example. Assuming a stalling situation occurs when the opening degree of the electronic expansion valve is 50%, a flow rate required by the system at this moment is less than the flow rate provided by the electronic expansion valve with such an opening degree, thus the situation that the actual superheat degree is less than the preset superheat degree occurs. Therefore, firstly, determining whether the low pressure of the system is lower than the low pressure alarm value, and whether the high pressure of the system is higher than the high pressure alarm value, and if such two cases occur, since increasing the rotational speed (or the displacement) of the compressor may further decrease the low pressure and increase the high pressure, the superheat degree cannot be controlled by adjusting the rotational speed of the compressor, for example, increasing the rotational speed (or the displacement) of the compressor, and the superheat degree can be increased only by increasing the rotational speed of the evaporator fan; and if such two situations don't occur, the superheat degree may be increased preferably by increasing the rotational speed (or the displacement) of the compressor because change of the rotational speed of the evaporator fan may adversely affect a comfort degree in the vehicle compartment.

Moreover, in the controlling process, if a current opening degree of the electronic expansion valve in the stalling situation is greater than the opening degree actually required, a refrigerating capacity generated by the vehicle air-conditioning system is more than the refrigerating capacity actually required, and the refrigerating capacity that is redundant may be neutralized by heat of a heating core; and if the opening degree of the electronic expansion valve in the stalling situation is smaller than the opening degree actually required, the refrigerating capacity generated by the vehicle air-conditioning system is less than the refrigerating capacity actually required, and the system may continue the process of fault processing.

In the method for controlling the vehicle air-conditioning system according to the present application, in the case that a fault occurs to the electronic expansion valve, the rotational speeds of the compressor and the evaporator fan may be adjusted to allow the system to continue to operate with a normal performance or a degraded performance while the system keeps a reasonable superheat degree, to allow the vehicle compartment to still have a refrigerating effect, and a battery to be cooled, so as not to cause damage to the system. Besides, the processing procedures may be adjusted according to the requirements, such as, in step S0423, the compressor may be turned off, or the compressor may continue to operate meanwhile a corresponding alarm is selected, and whether to turn off the compressor is a man-made selection.

Figure 7:
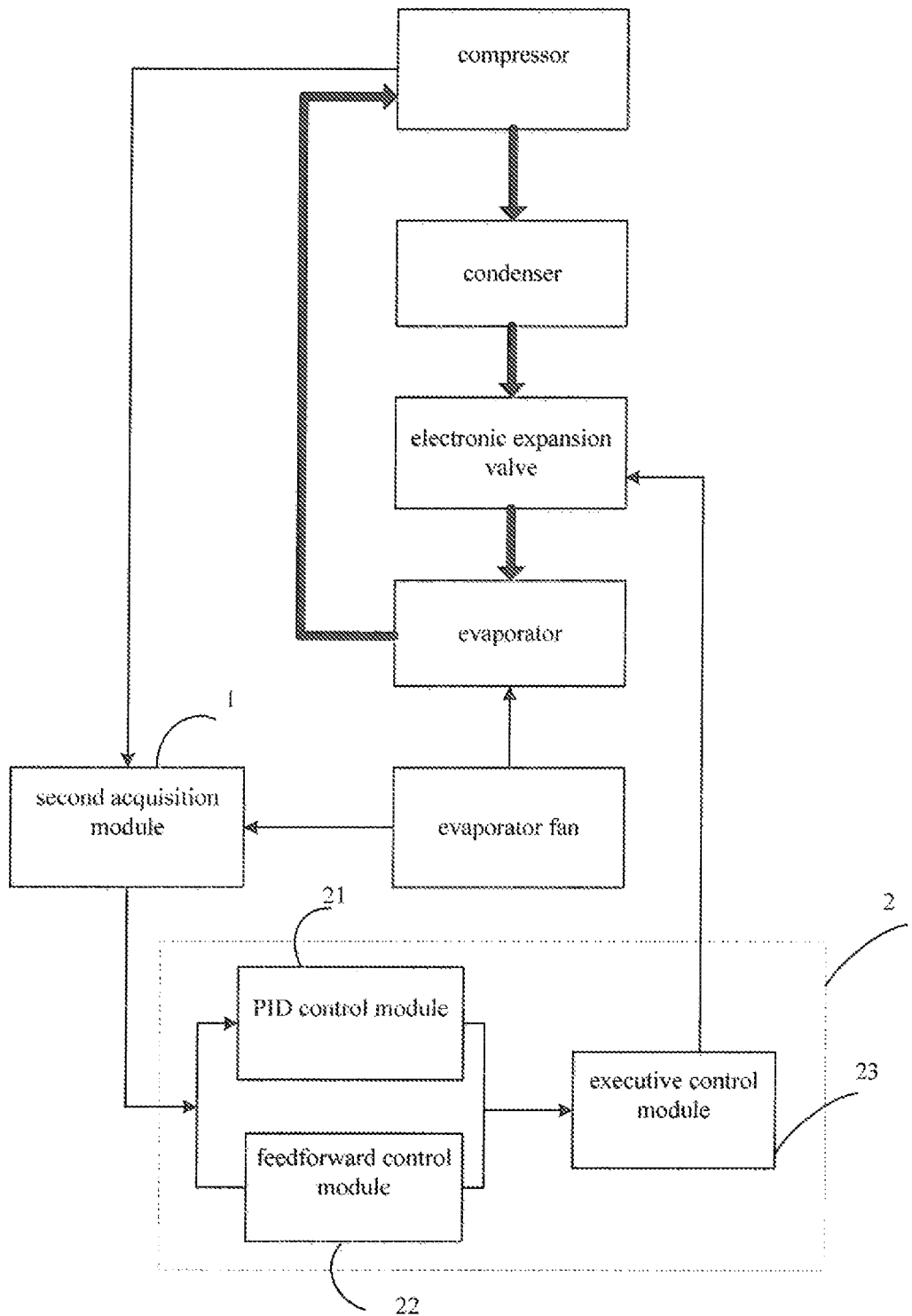
FIG. 7 is a block diagram showing the structure of a first embodiment of a vehicle air-conditioning system according to the present application.

As shown in FIG. 7, a vehicle air-conditioning system is further provided according to the present application, which includes a compressor set and a throttling element. The compressor set includes a compressor, a condenser, a condenser fan, an evaporator, and an evaporator fan. The throttling element is embodied as an electronic expansion valve. The heavy solid lines in the drawing indicate a refrigerant circulation. The vehicle air-conditioning system further includes a first acquisition module 1, and a first controller 2.

The first acquisition module 1 is configured to acquire an actual superheat degree and a feed forward information affecting change of the actual superheat degree in real time.

The first controller 2 is configured to store a preset superheat degree and receive the actual superheat degree and the feed forward information, and adjust the opening degree of the electronic expansion valve in real time according to the actual superheat degree, the preset superheat degree and the feed forward information.

In the vehicle air-conditioning system according to the present application, the opening degree of the electronic expansion valve is controlled through the actual superheat degree and the feed forward information. Compared with the conventional technology, an amplitude and a change direction of a disturbance can immediately obtained after the disturbance occurs to the system, thus the change of the superheat degree can be predicted in advance, and a fluctuation of the system is small, and a time required by the superheat degree to return to a control point is shorter compared with the conventional air-conditioning system in which the corresponding control is performed only after the superheat degree of the system changes.

Preferably, the feed forward information acquired by the first acquisition module 1 includes: change of the rotational speed and/or displacement of the compressor; and/or the change of the rotational speed of the evaporator fan.

The first acquisition module 1 includes a collection module configured to acquire a change information of the rotational speed (or the displacement) of the compressor and/or a change information of the rotational speed of the evaporator fan, and temperature sensors configured to acquire the temperatures at an outlet and an inlet of the evaporator respectively, and the collection module may be embodied as a rotational speed sensor or a pressure sensor.

In this embodiment, preferably, the first controller 2 is in communication with the electronic expansion valve via a vehicle CAN bus or a vehicle LIN bus; and the first acquisition module 1 is in communication with the first controller 2 via a vehicle CAN bus or a vehicle LIN bus.

As shown in FIG. 7, the first controller 2 includes a PID control module 21, a feed forward control module 22, and an executive control module 23.

The PID control module 21 is configured to store a preset superheat degree, and compare the actual superheat degree received with the preset superheat degree, to obtain a difference value of superheat degree, and obtain a corresponding first adjustment amount of the opening degree of the electronic expansion valve according to the difference value of superheat degree.

The feed forward control module 22 is configured to obtain a corresponding second adjustment amount of the opening degree of the electronic expansion valve according to the change of the rotational speed and/or the displacement of the compressor and/or the change of the rotational speed of the evaporator fan.

The executive control module 23 is configured to control adjusting the opening degree of the electronic expansion valve according to the first adjustment amount of the opening degree of the electronic expansion valve and the second adjustment amount of the opening degree of the electronic expansion valve.

In the PID control module 21, the first adjustment amount $V_{out}1$ of the opening degree of the electronic expansion valve is obtained by calculating the formula:

$$V_{out}1 = K_p \times e + K_d \times \frac{de}{dt} + K_i \times \int_n^t e\,dt + C,$$

in the formula, e is a difference value of superheat degree, $K_p$ is a proportionality coefficient, $K_d$ is a differential coefficient, $K_i$ is an integral coefficient, and C is a correction coefficient.

In the feed forward control module 22, the second output value $V_{out}2$ of the electronic expansion valve is obtained by the following calculation: the second adjustment amount $V_{out}2$ of the opening degree of the electronic expansion valve is any one of or the sum of a first part $V_{out}21$ of the second adjustment amount of the opening degree of the electronic expansion valve and a second part $V_{out}22$ of the second adjustment amount of the opening degree of the electronic expansion valve. The first part $V_{out}21$ of the second adjustment amount of the opening degree of the electronic expansion valve is obtained by calculating the formula:

$$V_{out}21 = K_{CS} \times \frac{dCS}{dt},$$

or the formula:

$$V_{out}21 = K_{CD} \times \frac{dCD}{dt},$$

or the formula:

$$V_{out}21 = K_{CS} \times \frac{dCS}{dt} + K_{CD} \times \frac{dCD}{dt},$$

and the second part $V_{out}22$ of the second adjustment amount of the opening degree of the electronic expansion valve is obtained by calculating the formula:

$$V_{out}22 = K_{BS} \times \frac{dBS}{dt},$$

in the formula, $K_{CS}$ is a feedback coefficient of the rotational speed of the compressor, CS is a rotational speed of the compressor, BS is a rotational speed of the evaporator fan, and $K_{BS}$ is a feedback coefficient of the evaporator fan; CD is a displacement of the compressor, and $K_{CD}$ is a feedback coefficient of the displacement of the compressor; in the executive control module 23, the first part $V_{out}21$ of the second adjustment amount of the opening degree of the electronic expansion valve and the second part $V_{out}22$ of the second adjustment amount of the opening degree of the electronic expansion valve are added together, and then a control signal for adjusting the opening degree is outputted to the electronic expansion valve.

Figure 8:
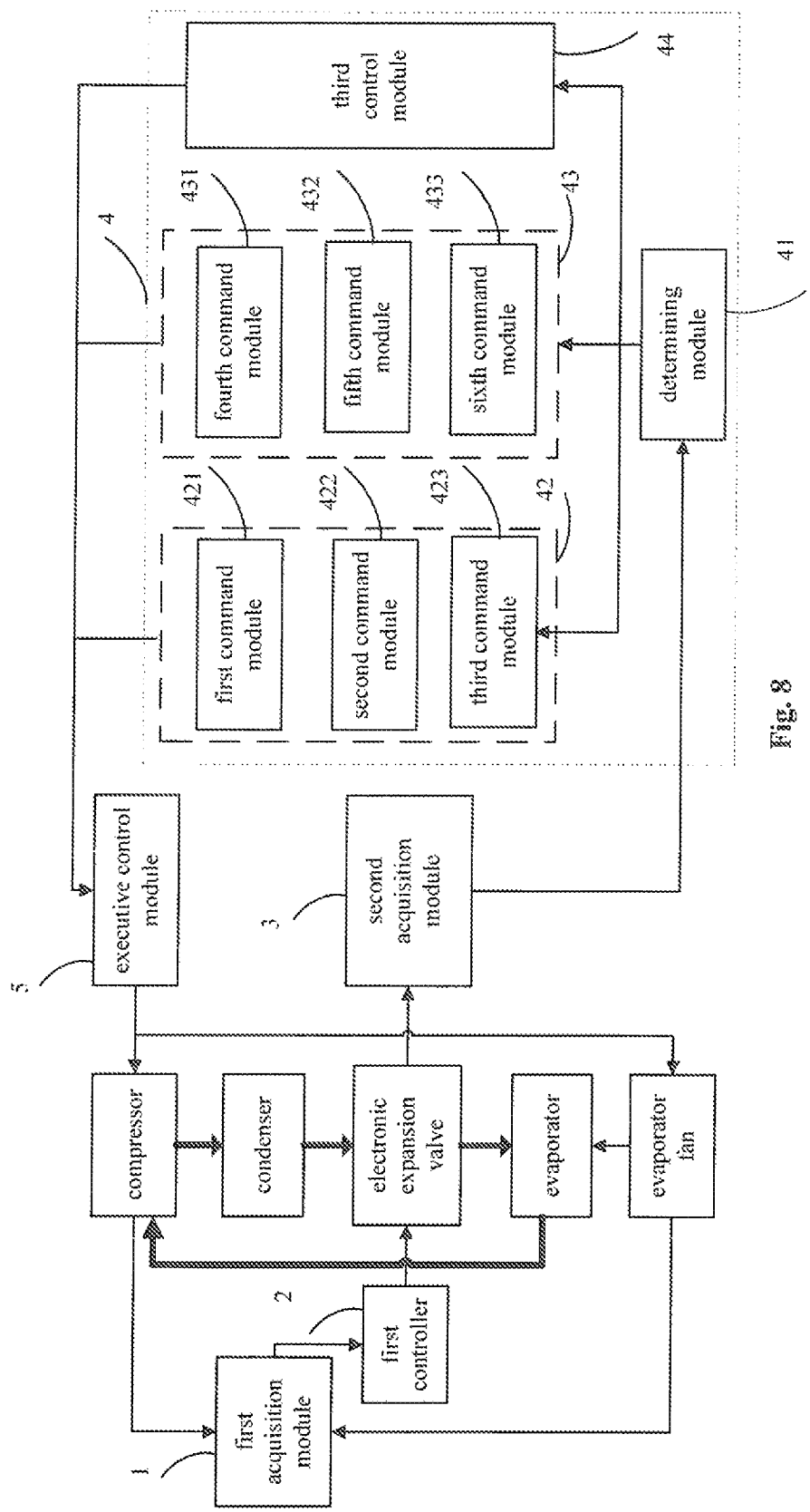
FIG. 8 is a block diagram showing the structure of a second embodiment of the vehicle air-conditioning system according to the present application; and The heavy solid lines in the drawing indicates a refrigerant circulation.

In this embodiment, as shown in FIG. 8, the vehicle air-conditioning system further includes: a second acquisition module 3, a second controller 4, and an executive control mechanism 5.

The second acquisition module 3 is configured to acquire an opening degree of the electronic expansion valve in real time.

The second controller 4 is configured to determine whether the electronic expansion valve is in a fault state according to an actual superheat degree, a preset superheat degree and the opening degree of the electronic expansion valve acquired, and generate a first control signal according to the actual superheat degree acquired when the determination result is that the electronic expansion valve is in a fault state.

The executive control mechanism 5 is configured to receive the first control signal sent by the second controller 4, and control adjusting a parameter of a device affecting the change of the actual superheat degree in the vehicle air-conditioning system, including the rotational speed and/or the displacement $C_1$ of the compressor, and/or the rotational speed $C_2$ of the evaporator fan according to the first control signal.

In this embodiment, the second acquisition module 3 is in communication with the first controller 2 via a vehicle controller area network (CAN) bus or a vehicle local interconnect network (LIN) bus; and the second controller 4 is in communication with the electronic expansion valve via a vehicle CAN bus or a vehicle LIN bus.

In this embodiment, preferably, the executive control mechanism 5 is a vehicle-mounted controller electronic control unit (ECU).

The second controller 4 includes a determining module 41, a first control module 42, a second control module 43, and a third control module 44.

The determining module 41 is configured to determine whether the electronic expansion valve is in a fault state according to the actual superheat degree, the preset superheat degree, and the opening degree of the electronic expansion valve, and generate a first control command when the determination results is that the electronic expansion valve is in the fault state;

The first control module 42 is configured to receive the first control command sent by the determining module 41, and control the executive control mechanism 5 to execute the command of decreasing the rotational speed or displacement $C_1$ of the compressor, or decreasing the rotational speed $C_2$ of the evaporator fan, or turning off the compressor in the case that the actual superheat degree is greater than a first preset auxiliary superheat degree.

The second control module 43 is configured to receive the first control command sent by the determining module 41, and control the executive control mechanism 5 to execute the command of increasing the rotational speed or the displacement $C_1$ of the compressor, or increasing the rotational speed $C_2$ of the evaporator fan, or turning off the compressor in the case that the actual superheat degree is smaller than a second preset auxiliary superheat degree.

The third control module 44 is configured to receive the first control command sent by the determining module 41, and control the executive control mechanism 5 to execute the command of keeping the rotational speed or displacement $C_1$ of the compressor unchanged, or keeping the rotational speed $C_2$ of the evaporator fan unchanged, or the command of allowing the rotational speed or displacement $C_1$ of the compressor or the rotational speed $C_2$ of the evaporator fan to enter into an appropriate adjustment state in the case that the actual superheat degree is greater than or equal to the second preset auxiliary superheat degree, and is smaller than or equal to the first preset auxiliary superheat degree.

The first control module 42 includes a first command module 421, a second command module 422, and a third command module 423.

The first command module 421 is configured to control the executive control mechanism 5 to execute the command of decreasing the rotational speed or displacement $C_1$ of the compressor in the case that the rotational speed or displacement $C_1$ of the compressor is greater than the minimum value $C_{1min}+\Delta_1$.

The second command module 422 is configured to control the executive control mechanism 5 to execute the command of decreasing the rotational speed $C_2$ of the evaporator fan in the case that the rotational speed or the displacement $C_1$ of the compressor reaches the minimum value $C_{1min}+\Delta_1$, and the rotational speed $C_2$ of the evaporator fan is greater than the minimum value $C_{2min}+\Delta_2$.

The third command module 423 is configured to control the executive control mechanism 5 to execute the command of turning off the compressor in the case that the rotational speed or displacement $C_1$ of the compressor reaches the minimum value $C_{1min}+\Delta_1$, and the rotational speed $C_2$ of the evaporator fan reaches the minimum value $C_{2min}+\Delta_2$.

The second control module 43 includes a fourth command module 431, a fifth command module 432, and a sixth command module 433.

The fourth command module 431 is configured to control the executive control mechanism 5 to execute the command of increasing the rotational speed or displacement $C_1$ of the compressor in the case that the low pressure of the vehicle air-conditioning system is higher than the low pressure alarm value, and the high pressure of the vehicle air-conditioning system is lower than the high pressure alarm value and the rotational speed or displacement $C_1$ of the compressor is smaller than the maximum value $C_{1max}-\Delta_3$.

The fifth command module 432 is configured to control the executive control mechanism 5 to execute the command of increasing the rotational speed $C_2$ of the evaporator fan in the case that the low pressure of the vehicle air-conditioning system is lower than the low pressure alarm value, or the high pressure of the vehicle air-conditioning system is higher than the high pressure alarm value and the rotational speed $C_2$ of the evaporator fan is smaller than the maximum value $C_{2max}-\Delta_4$.

The sixth command module 433 is configured to control the executive control mechanism 5 to execute the command of turning off the compressor in the case that the low pressure of the vehicle air-conditioning system is lower than the low pressure alarm value, or the high pressure of the vehicle air-conditioning system is higher than the high pressure alarm value and the rotational speed $C_2$ of the evaporator fan reaches the maximum value $C_{2max}-\Delta_4$.

In this embodiment, the first acquisition module 1, the second acquisition module 3, the second controller 4 and the first controller 2 may be integrated in one chip, for example, uniformly built in a microprogrammed control unit (MCU), and in addition may also be assembled in multiple chips. Further the step of adding the first adjustment amount $V_{out}1$ of the opening degree of the electronic expansion valve and the second adjustment amount $V_{out}2$ of the opening degree of the electronic expansion valve together may be performed by an executive control module or an executive control mechanism, or may also be performed by other modules in the control system. Moreover, it is to be noted that, the second controller 4 may further include therein a hardware diagnosis module for hardware fault diagnosis, configured to detect a driving current and a driving voltage to obtain fault information such as open circuit, short circuit, and out of step.

The embodiments described above are preferred embodiments of the present application, it should be noted that, for the those skilled in the art, a few improvements and modifications may further be made without departing from the principle of the present application, and these improvements and modifications are also deemed to fall into the protection scope of the present application.

The invention claimed is:

1. A method for controlling a superheat degree of a vehicle air-conditioning system, comprising:
   acquiring, by a first acquisition module of a control system in a real time manner, an actual superheat degree, a preset superheat degree, and a feed forward information affecting the actual superheat degree; and
   adjusting, by a first controller, an opening degree of an electronic expansion valve in real time according to the actual superheat degree, the preset superheat degree and the feed forward information acquired, to control the superheat degree of the vehicle air-conditioning system;
   wherein the feed forward information comprises:
   a change of a rotational speed and/or a displacement of a compressor; and/or a change of a rotational speed of an evaporator fan;
   wherein the first controller is in communication with the electronic expansion valve via a vehicle controller area network (CAN) bus or a vehicle local interconnect network (LIN) bus; and the first acquisition module is in communication with the first controller via a vehicle CAN bus or a vehicle LIN bus.

2. The method for controlling the superheat degree of the vehicle air-conditioning system according to claim 1, wherein the step of, adjusting, by a first controller, the opening degree of the electronic expansion valve in real time according to the actual superheat degree, the preset superheat degree and the feed forward information, to control the superheat degree of the vehicle air-conditioning system, comprises:
   comparing the actual superheat degree acquired with the preset superheat degree acquired to obtain a difference value of the superheat degree, and acquiring a corresponding first adjustment amount of the opening degree of the electronic expansion valve according to the difference value of the superheat degree;
   acquiring a corresponding second adjustment amount of the opening degree of the electronic expansion valve according to a change information of the rotational speed or the displacement of the compressor, and/or a change information of the rotational speed of the evaporator fan; and
   adjusting the opening degree of the electronic expansion valve according to the first adjustment amount of the opening degree of the electronic expansion valve and the second adjustment amount of the opening degree of the electronic expansion valve.

3. The method for controlling the superheat degree of the vehicle air-conditioning system according to claim 2, wherein:
   the first adjustment amount $V_{out}1$ of the opening degree of the electronic expansion valve is calculated by the following formula:

$$V_{out}1 = K_p \times e + K_d \times \frac{de}{dt} + K_i \times \int_n^t e\, dt + C,$$

in the formula, e is a difference value of superheat degree between the actual superheat degree and the preset superheat degree, $K_p$ is a proportionality coefficient, $K_d$ is a differential coefficient, $K_i$ is an integral coefficient, and C is a correction coefficient;

the second adjustment amount $V_{out}2$ of the opening degree of the electronic expansion valve is any one of or the sum of a first part $V_{out}21$ of the second adjustment amount of the opening degree of the electronic expansion valve, and a second part $V_{out}22$ of the second adjustment amount of the opening degree of the electronic expansion valve; wherein the first part $V_{out}21$ of the second adjustment amount of the opening degree of the electronic expansion valve is calculated by the following formula:

$$V_{out}21 = K_{CS} \times \frac{dCS}{dt},$$

or the formula:

$$V_{out}21 = K_{CD} \times \frac{dCD}{dt},$$

or the formula:

$$V_{out}21 = K_{CS} \times \frac{dCS}{dt} + K_{CD} \times \frac{dCD}{dt},$$

and the second part $V_{out}22$ of the second adjustment amount of the opening degree of the electronic expansion valve is calculated by the following formula:

$$V_{out}22 = K_{BS} \times \frac{dBS}{dt},$$

in the formula, $K_{CS}$ is a feedback coefficient of the rotational speed of the compressor, CS is a rotational speed of the compressor, BS is a rotational speed of the evaporator fan, and $K_{BS}$ is a feedback coefficient of the evaporator fan, CD is a displacement of the compressor, and $K_{CD}$ is a feedback coefficient of the displacement of the compressor;

and the first adjustment amount $V_{out}1$ of the opening degree of the electronic expansion valve and the second adjustment amount $V_{out}2$ of the opening degree of the electronic expansion valve are added together, and a control signal for adjusting the opening degree is outputted to a control terminal of the electronic expansion valve in the case that the opening degree of the electronic expansion valve is adjusted according to the first adjustment amount $V_{out}1$ of the opening degree of the electronic expansion valve and the second adjustment amount $V_{out}2$ of the opening degree of the electronic expansion valve.

4. The method for controlling the superheat degree of the vehicle air-conditioning system according to claim 3, wherein the adjustment amount of the opening degree obtained by adding the first adjustment amount $V_{out}1$ of the opening degree of the electronic expansion valve and the second adjustment amount $V_{out}2$ of the opening degree of the electronic expansion valve together is smaller than or equal to a maximum change rate of the opening degree of the electronic expansion valve.

5. The method for controlling the superheat degree of the vehicle air-conditioning system according to claim 3, wherein the electronic expansion valve does not operate in the case that the adjustment amount of the opening degree of the electronic expansion valve obtained by adding the first adjustment amount $V_{out}1$ of the opening degree of the electronic expansion valve and the second adjustment amount $V_{out}2$ of the opening degree of the electronic expansion valve together is smaller than a number of minimum action steps in an opening degree interval where the electronic expansion valve is currently located, set in the control system; and the electronic expansion valve operates to reduce the disturbance to the system in the case that the adjustment amount of the opening degree of the electronic expansion valve is greater than or equal to a number of minimum action steps in the opening degree interval where the electronic expansion valve is currently located, set in the control system.

6. The method for controlling the superheat degree of the vehicle air-conditioning system according to claim 1, further comprising:

acquiring, by the control system, the opening degree of the electronic expansion valve, and determining whether the electronic expansion valve and communication with the electronic expansion valve is in a fault state according to the actual superheat degree, the preset superheat degree and the opening degree of the electronic expansion valve acquired; and outputting, by the control system, a control signal to an executive control mechanism, and controlling, by the executive control mechanism, adjusting a parameter of a device affecting the change of the actual superheat degree in the vehicle air-conditioning system, to adjust the superheat degree of the vehicle air-conditioning system when the determination result is that the electronic expansion valve and the communication with the electronic expansion valve is in a fault state, wherein the parameter of the device affecting the change of the actual superheat degree in the vehicle air-conditioning system comprises the rotational speed and/or the displacement $C_1$ of the compressor, and/or the rotational speed $C_2$ of the evaporator fan.

7. The method for controlling the superheat degree of the vehicle air-conditioning system according to claim 6, wherein on the premise that the determination result is the electronic expansion valve and the communication with the electronic expansion valve being in a fault state:

outputting, by the control system, a control signal to the executive control mechanism, and controlling, by the executive control mechanism, reducing the rotational speed or the displacement $C_1$ of the compressor, or reducing the rotational speed $C_2$ of the evaporator fan, or turning off the compress in the case that the actual superheat degree is greater than a first preset auxiliary superheat degree;

outputting, by the control system, a control signal to the executive control mechanism, and controlling, by the executive control mechanism, increasing the rotational speed or the displacement $C_1$ of the compressor, or increasing the rotational speed $C_2$ of the evaporator fan, or turning off the compressor in the case that the actual superheat degree is smaller than a second preset auxiliary superheat degree; and outputting, by the control system, a control signal to the executive control mechanism, and controlling, by the executive control mechanism, keeping the rotational speed or the displacement $C_1$ of the compressor and the rotational speed $C_2$ of the evaporator fan unchanged in the case that the actual superheat degree is greater than or equal to the second preset auxiliary superheat degree, and is smaller than or equal to the first preset auxiliary superheat degree.

8. A vehicle air-conditioning system, comprising a compressor set and a throttling element, wherein the compressor set comprises a compressor, a condenser, an evaporator, and an evaporator fan, and the throttling element comprises an electronic expansion valve; wherein
the vehicle air-conditioning system further comprises:
a first acquisition module, configured to acquire an actual superheat degree and a feed forward information affecting change of the actual degree of super heat in real time; and
a first controller, configured to store a preset superheat degree and receive the actual superheat degree and the feed forward information, and adjust the opening degree of the electronic expansion valve in real time according to the actual superheat degree, the preset superheat degree and the feed forward information; wherein the feed forward information comprises: a change of the rotational speed and/or the displacement of the compressor; and/or a change of the rotational speed of the evaporator fan;
wherein the first controller is in communication with the electronic expansion valve via a vehicle controller area network (CAN) bus or a vehicle local interconnect network (LIN) bus; and the first acquisition module is in communication with the first controller via a vehicle CAN bus or a vehicle LIN bus.

9. The vehicle air-conditioning system according to claim 8, wherein the first controller comprises a PID control module, a feed forward control module, and an executive control module;
the PID control module is configured to store a preset superheat degree, and compare the actual superheat degree received with the preset superheat degree to obtain a difference value of superheat degree, and obtain a corresponding first adjustment amount of the opening degree of the electronic expansion valve according to the difference value of superheat degree;
the feed forward control module is configured to obtain a corresponding second adjustment amount of the opening degree of the electronic expansion valve according to the change of the rotational speed or the displacement of the compressor and/or the change of the rotational speed of the evaporator fan received; and
the executive control module is configured to control adjusting the opening degree of the electronic expansion valve according to the first adjustment amount of the opening degree of the electronic expansion valve and the second adjustment amount of the opening degree of the electronic expansion valve.

10. The vehicle air-conditioning system according to claim 9, wherein the PID control module obtains the first adjustment amount $V_{out}1$ of the opening degree of the electronic expansion valve by the formula:

$$V_{out}1 = K_p \times e + K_d \times \frac{de}{dt} + K_i \times \int_n^t e\, dt + C,$$

in the formula, e is a difference value of superheat degree, $K_p$ is a proportionality coefficient, $K_d$ is a differential coefficient, $K_i$ is an integral coefficient, and C is a correction coefficient;
the feed forward control module obtains the second adjustment amount $V_{out}2$ of the opening degree of the electronic expansion valve by the calculation that, the second adjustment amount $V_{out}2$ of the opening degree of the electronic expansion valve is any one of or the sum of a first part $V_{out}21$ of the second adjustment amount of the opening degree of the electronic expansion valve and a second part $V_{out}22$ of the second adjustment amount of the opening degree of the electronic expansion valve, wherein the first part $V_{out}21$ of the second adjustment amount of the opening degree of the electronic expansion valve is calculated by the formula:

$$V_{out}21 = K_{CS} \times \frac{dCS}{dt},$$

or the formula:

$$V_{out}21 = K_{CD} \times \frac{dCD}{dt},$$

or the formula:

$$V_{out}21 = K_{CS} \times \frac{dCS}{dt} + K_{CD} \times \frac{dCD}{dt},$$

and the second part $V_{out}22$ of the second adjustment amount of the opening degree of the electronic expansion valve is obtained by calculating the formula:

$$V_{out}22 = K_{BS} \times \frac{dBS}{dt},$$

in the formula, $K_{CS}$ is a feedback coefficient of the rotational speed of the compressor, CS is a rotational speed of the compressor, BS is a rotational speed of the evaporator fan, and $K_{BS}$ is a feedback coefficient of the evaporator fan; CD is a displacement of the compressor, and $K_{CD}$ is a feedback coefficient of the displacement of the compressor; and
the executive control module adds the first adjustment amount $V_{out}1$ of the opening degree of the electronic expansion valve and the second adjustment amount $V_{out}2$ of the opening degree of the electronic expansion valve together to output a control signal for adjusting the opening degree to a control terminal of the electronic expansion valve.

11. The vehicle air-conditioning system according to claim 8, further comprising a second acquisition module, a second controller, and an executive control mechanism, wherein
the second acquisition module is configured to acquire the opening degree of the electronic expansion valve in real time;
the second controller is configured to determine whether the electronic expansion valve and the communication with the electronic expansion valve are in the fault state according to the actual superheat degree, the preset superheat degree, and the opening degree of the electronic expansion valve acquired, and generate a first control signal according to the actual superheat degree acquired when the determination result is that the electronic expansion valve is in a fault state; and the executive control mechanism is configured to receive the first control signal sent by the second controller, and control according to the first control signal, adjusting a parameter of a device affecting the change of the actual superheat degree in the vehicle air-conditioning system, wherein the parameter of the device affecting the change of the actual superheat degree in the vehicle air-conditioning system comprises the rotational speed and/or the displacement $C_1$ of the compressor, and/or the rotational speed $C_2$ of the evaporator fan.

12. The method for controlling the superheat degree of the vehicle air-conditioning system according to claim 1, further comprising:

acquiring, by the control system, the opening degree of the electronic expansion valve, and determining whether the electronic expansion valve and communication with the electronic expansion valve is in a fault state according to the actual superheat degree, the preset superheat degree and the opening degree of the electronic expansion valve acquired; and outputting, by the control system, a control signal to an executive control mechanism, and controlling, by the executive control mechanism, adjusting a parameter of a device affecting the change of the actual superheat degree in the vehicle air-conditioning system, to adjust the superheat degree of the vehicle air-conditioning system when the determination result is that the electronic expansion valve and the communication with the electronic expansion valve is in a fault state, wherein the parameter of the device affecting the change of the actual superheat degree in the vehicle air-conditioning system comprises the rotational speed and/or the displacement $C_1$ of the compressor, and/or the rotational speed $C_2$ of the evaporator fan.

13. The method for controlling the superheat degree of the vehicle air-conditioning system according to claim 2, further comprising:

acquiring, by the control system, the opening degree of the electronic expansion valve, and determining whether the electronic expansion valve and communication with the electronic expansion valve is in a fault state according to the actual superheat degree, the preset superheat degree and the opening degree of the electronic expansion valve acquired; and outputting, by the control system, a control signal to an executive control mechanism, and controlling, by the executive control mechanism, adjusting a parameter of a device affecting the change of the actual superheat degree in the vehicle air-conditioning system, to adjust the superheat degree of the vehicle air-conditioning system when the determination result is that the electronic expansion valve and the communication with the electronic expansion valve is in a fault state, wherein the parameter of the device affecting the change of the actual superheat degree in the vehicle air-conditioning system comprises the rotational speed and/or the displacement $C_1$ of the compressor, and/or the rotational speed $C_2$ of the evaporator fan.

14. The method for controlling the superheat degree of the vehicle air-conditioning system according to claim 3, further comprising:

acquiring, by the control system, the opening degree of the electronic expansion valve, and determining whether the electronic expansion valve and communication with the electronic expansion valve is in a fault state according to the actual superheat degree, the preset superheat degree and the opening degree of the electronic expansion valve acquired; and outputting, by the control system, a control signal to an executive control mechanism, and controlling, by the executive control mechanism, adjusting a parameter of a device affecting the change of the actual superheat degree in the vehicle air-conditioning system, to adjust the superheat degree of the vehicle air-conditioning system when the determination result is that the electronic expansion valve and the communication with the electronic expansion valve is in a fault state, wherein the parameter of the device affecting the change of the actual superheat degree in the vehicle air-conditioning system comprises the rotational speed and/or the displacement $C_1$ of the compressor, and/or the rotational speed $C_2$ of the evaporator fan.

15. The method for controlling the superheat degree of the vehicle air-conditioning system according to claim 12, wherein on the premise that the determination result is the electronic expansion valve and the communication with the electronic expansion valve being in a fault state:

outputting, by the control system, a control signal to the executive control mechanism, and controlling, by the executive control mechanism, reducing the rotational speed or the displacement $C_1$ of the compressor, or reducing the rotational speed $C_2$ of the evaporator fan, or turning off the compress in the case that the actual superheat degree is greater than a first preset auxiliary superheat degree;

outputting, by the control system, a control signal to the executive control mechanism, and controlling, by the executive control mechanism, increasing the rotational speed or the displacement $C_1$ of the compressor, or increasing the rotational speed $C_2$ of the evaporator fan, or turning off the compressor in the case that the actual superheat degree is smaller than a second preset auxiliary superheat degree; and outputting, by the control system, a control signal to the executive control mechanism, and controlling, by the executive control mechanism, keeping the rotational speed or the displacement $C_1$ of the compressor and the rotational speed $C_2$ of the evaporator fan unchanged in the case that the actual superheat degree is greater than or equal to the second preset auxiliary superheat degree, and is smaller than or equal to the first preset auxiliary superheat degree.

16. The vehicle air-conditioning system according to claim 8, further comprising a second acquisition module, a second controller, and an executive control mechanism, wherein the second acquisition module is configured to acquire the opening degree of the electronic expansion valve in real time;

the second controller is configured to determine whether the electronic expansion valve and the communication with the electronic expansion valve are in the fault state according to the actual superheat degree, the preset superheat degree, and the opening degree of the electronic expansion valve acquired, and generate a first control signal according to the actual superheat degree acquired when the determination result is that the electronic expansion valve is in a fault state; and the executive control mechanism is configured to receive the first control signal sent by the second controller, and control according to the first control signal, adjusting a parameter of a device affecting the change of the actual superheat degree in the vehicle air-conditioning system, wherein the parameter of the device affecting the change of the actual superheat degree in the vehicle air-conditioning system comprises the rotational speed and/or the displacement $C_1$ of the compressor, and/or the rotational speed $C_2$ of the evaporator fan.

17. The vehicle air-conditioning system according to claim 9, further comprising a second acquisition module, a second controller, and an executive control mechanism, wherein the second acquisition module is configured to acquire the opening degree of the electronic expansion valve in real time;

the second controller is configured to determine whether the electronic expansion valve and the communication with the electronic expansion valve are in the fault state according to the actual superheat degree, the preset superheat degree, and the opening degree of the electronic expansion valve acquired, and generate a first control signal according to the actual superheat degree acquired when the determination result is that the electronic expansion valve is in a fault state; and the executive control mechanism is configured to receive the first control signal sent by the second controller, and control according to the first control signal, adjusting a parameter of a device affecting the change of the actual superheat degree in the vehicle air-conditioning system, wherein the parameter of the device affecting the change of the actual superheat degree in the vehicle air-conditioning system comprises the rotational speed and/or the displacement $C_1$ of the compressor, and/or the rotational speed $C_2$ of the evaporator fan.

18. The vehicle air-conditioning system according to claim 10, further comprising a second acquisition module, a second controller, and an executive control mechanism, wherein the second acquisition module is configured to acquire the opening degree of the electronic expansion valve in real time;

the second controller is configured to determine whether the electronic expansion valve and the communication with the electronic expansion valve are in the fault state according to the actual superheat degree, the preset superheat degree, and the opening degree of the electronic expansion valve acquired, and generate a first control signal according to the actual superheat degree acquired when the determination result is that the electronic expansion valve is in a fault state; and the executive control mechanism is configured to receive the first control signal sent by the second controller, and control according to the first control signal, adjusting a parameter of a device affecting the change of the actual superheat degree in the vehicle air-conditioning system, wherein the parameter of the device affecting the change of the actual superheat degree in the vehicle air-conditioning system comprises the rotational speed and/or the displacement $C_1$ of the compressor, and/or the rotational speed $C_2$ of the evaporator fan.

* * * * *